(12) United States Patent
Gropper

(10) Patent No.: US 9,201,881 B2
(45) Date of Patent: *Dec. 1, 2015

(54) AUTO UPDATE UTILITY FOR DIGITAL ADDRESS BOOKS

(71) Applicant: LINKEDIN CORPORATION, Mountain View, CA (US)

(72) Inventor: Robert L. Gropper, Redmond, WA (US)

(73) Assignee: LINKEDIN CORPORATION, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,757

(22) Filed: Jun. 26, 2014

(65) Prior Publication Data

US 2014/0310343 A1  Oct. 16, 2014

Related U.S. Application Data

(63) Continuation of application No. 14/077,178, filed on Nov. 11, 2013, now Pat. No. 8,862,618, which is a continuation of application No. 13/245,728, filed on Sep. 26, 2011, now Pat. No. 8,601,022, which is a (Continued)

(51) Int. Cl.
*G06F 17/30* (2006.01)
*G06Q 30/02* (2012.01)
*H04L 29/12* (2006.01)

(52) U.S. Cl.
CPC .... *G06F 17/30017* (2013.01); *G06F 17/30067* (2013.01); *G06F 17/30864* (2013.01); *G06Q 30/02* (2013.01); *H04L 61/1505* (2013.01)

(58) Field of Classification Search
CPC ............... G06F 17/30864; G06F 17/30067
USPC ........... 707/769, 770, 796; 219/203, 217, 219
See application file for complete search history.

(56) References Cited

U.S. PATENT DOCUMENTS 6,263,360 B1 * 7/2001 Arnold et al. ................. 709/203
6,457,012 B1    9/2002 Jatkowski
(Continued)

OTHER PUBLICATIONS

John Lamb et al., LAN-Based Office for the Enterprise, A Case Study, 1994, IEEE, 440-447.*

(Continued)

*Primary Examiner* — Jean B Fleurantin
(74) *Attorney, Agent, or Firm* — Wilson Sonsini Goodrich & Rosati

(57) ABSTRACT

An Internet-based system capable of automatically maintaining contact-related information in any computer software application or digital device which stores or manages contact-related information. More particularly, the system allows users to automatically enter and maintain contact-related information in a digital address book or similar application or device (such as a wireless phone or PDA) with minimal or no manual entry of the contact-related information by the user. The system also allows contacts of the user (i.e. people who's contact information or partial contact information is present in the user's address book application) to make corrections to their contact-related information contained in the user's address book, request reciprocal contact information from the user, deny the user access to additional or corrected contact-related information and take other actions relative to managing the contact-related information which others (users) have about them.

14 Claims, 18 Drawing Sheets

Related U.S. Application Data continuation of application No. 12/406,024, filed on Mar. 17, 2009, now Pat. No. 8,032,549, which is a continuation of application No. 09/969,503, filed on Oct. 1, 2001, now Pat. No. 7,505,974, which is a continuation-in-part of application No. 09/249,269, filed on Feb. 12, 1999, now Pat. No. 6,883,000.

(60) Provisional application No. 60/236,872, filed on Sep. 29, 2000.

(56) References Cited

U.S. PATENT DOCUMENTS

| | | | |
|---|---|---|---|
| 6,564,264 B1 * | 5/2003 | Creswell et al. | 709/245 |
| 6,829,607 B1 | 12/2004 | Tafoya et al. | |
| 7,003,546 B1 | 2/2006 | Cheah | |
| 7,056,217 B1 | 6/2006 | Pelkey et al. | |
| 7,861,174 B2 | 12/2010 | Krasnoiarov et al. | |
| 8,032,549 B2 | 10/2011 | Gropper | |
| 8,601,022 B2 | 12/2013 | Gropper | |
| 8,862,618 B2 | 10/2014 | Gropper | |
| 8,984,005 B2 | 3/2015 | Gropper | |
| 2002/0156812 A1 * | 10/2002 | Krasnoiarov et al. | 707/513 |
| 2003/0131006 A1 | 7/2003 | Monahan et al. | |
| 2014/0136605 A1 | 5/2014 | Gropper | |
| 2014/0164492 A1 | 6/2014 | Gropper | |
| 2014/0164493 A1 | 6/2014 | Gropper | |
| 2014/0164494 A1 | 6/2014 | Gropper | |

OTHER PUBLICATIONS

Office action dated Mar. 27, 2014 for U.S. Appl. No. 14/077,178.
Office action dated May 22, 2014 for U.S. Appl. No. 14/180,299.
Office action dated May 30, 2014 for U.S. Appl. No. 14/180,325.
Office action dated Jun. 16, 2014 for U.S. Appl. No. 14/180,311.
Van Steen, et al. Locating objects in wide-area systems. Communications Magazine, IEEE 36.1. 1998;104-109.
Notice of allowance dated Nov. 13, 2014 for U.S. Appl. No. 14/180,299.
Office action dated Nov. 13, 2014 for U.S. Appl. No. 14/180,325.
Watanabe, et al. Visual interface for retrieval of electronic-formed books, Oct. 20-22, 1993, IEEE, 692-695.
Notice of allowance dated Jul. 31, 2014 for U.S. Appl. No. 14/077,178.
Office action dated Sep. 25, 2014 for U.S. Appl. No. 14/180,299.
Office action dated Oct. 23, 2014 for U.S. Appl. No. 14/180,311.
Dorbes, et al. Beyond RCS: Capitalizing on address book to embrace multimedia services. 2009, IEEE, 6 pages.
Notice of allowance dated Apr. 30, 2015 for U.S. Appl. No. 14/180,325.
Office action dated Feb. 25, 2015 for U.S. Appl. No. 14/180,311.
Notice of allowance dated Jul. 15, 2015 for U.S. Appl. No. 14/180,325.
Office action dated Aug. 14, 2015 for U.S. Appl. No. 14/180,311.
Notice of allowance dated Sep. 24, 2015 for U.S. Appl. No. 14/180,325.

* cited by examiner

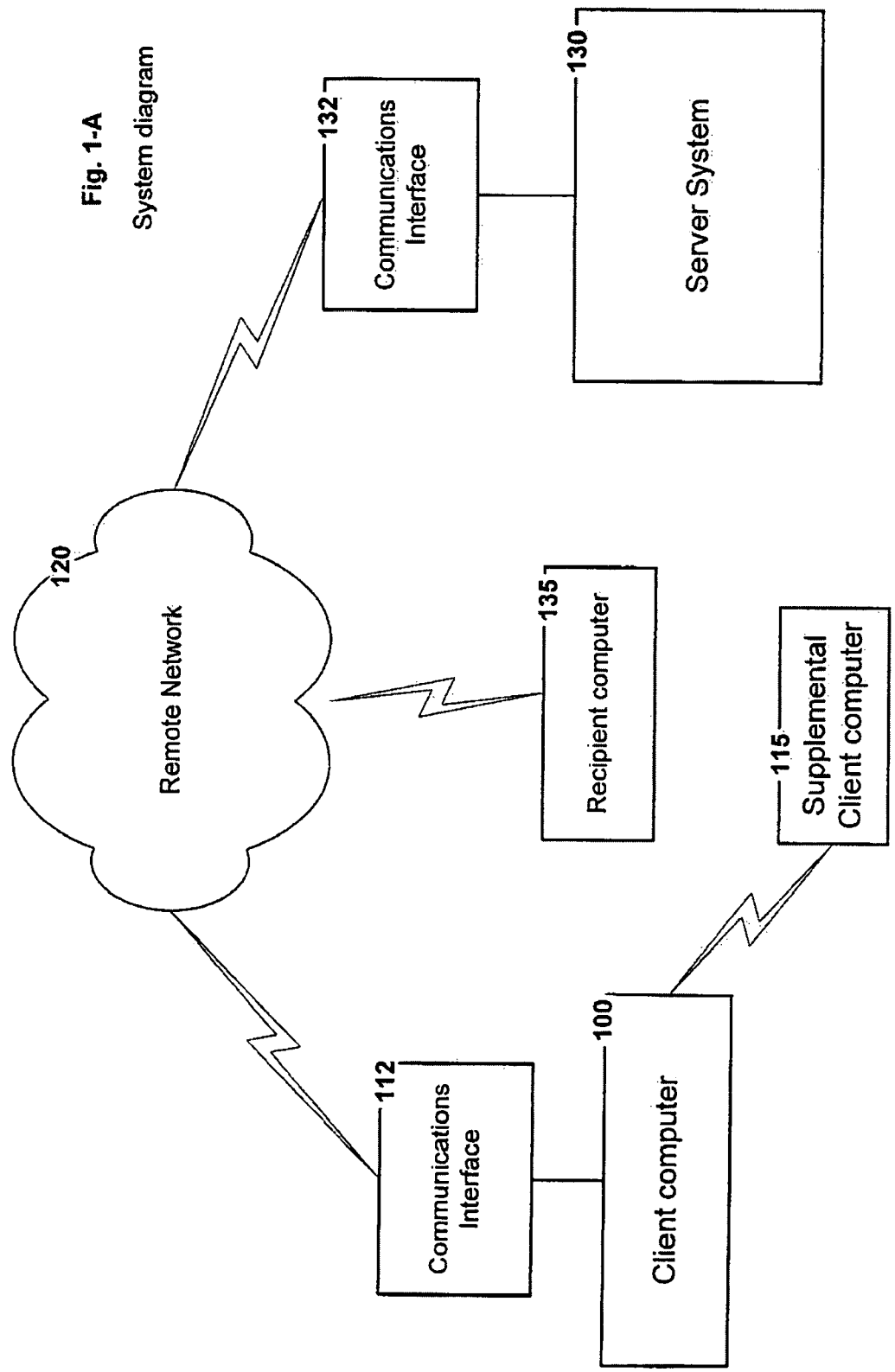
Fig. 1-A
System diagram

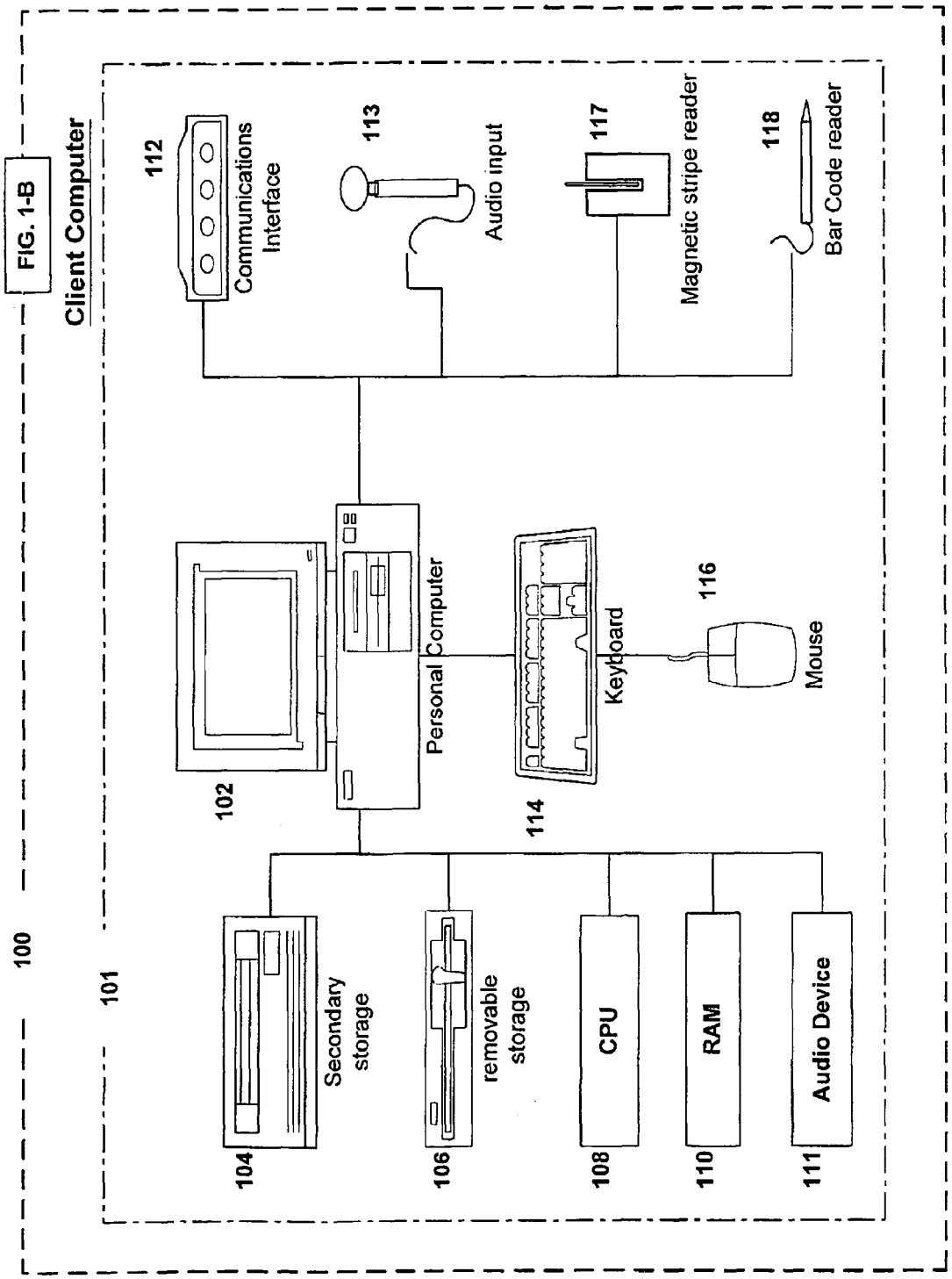

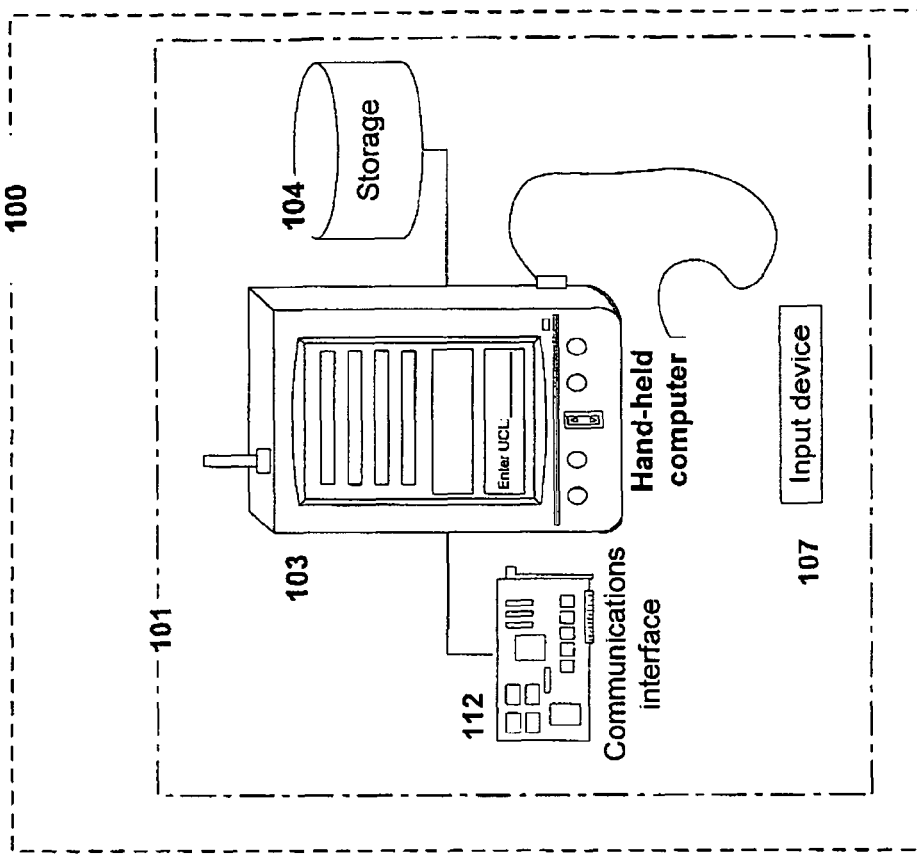
FIG. 1-D
Portable client computers
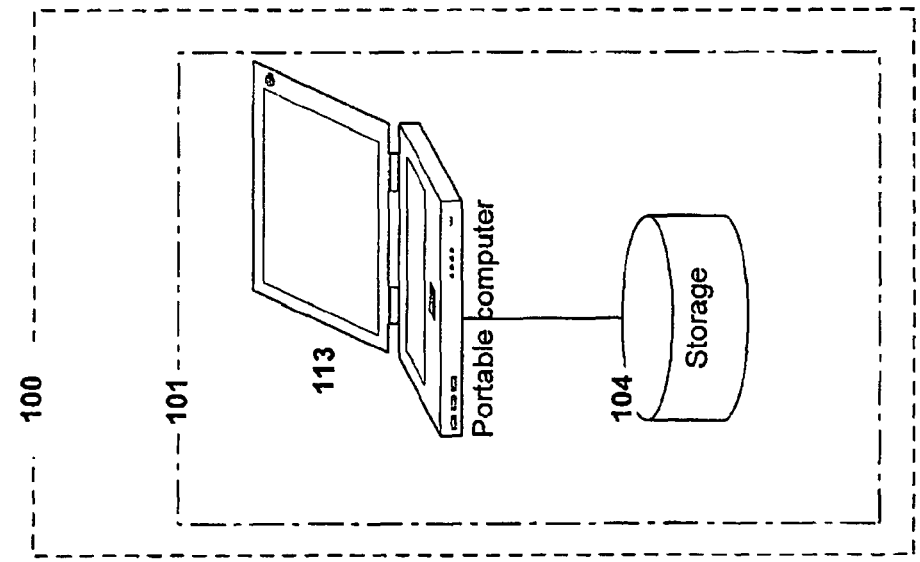
FIG. 1-C

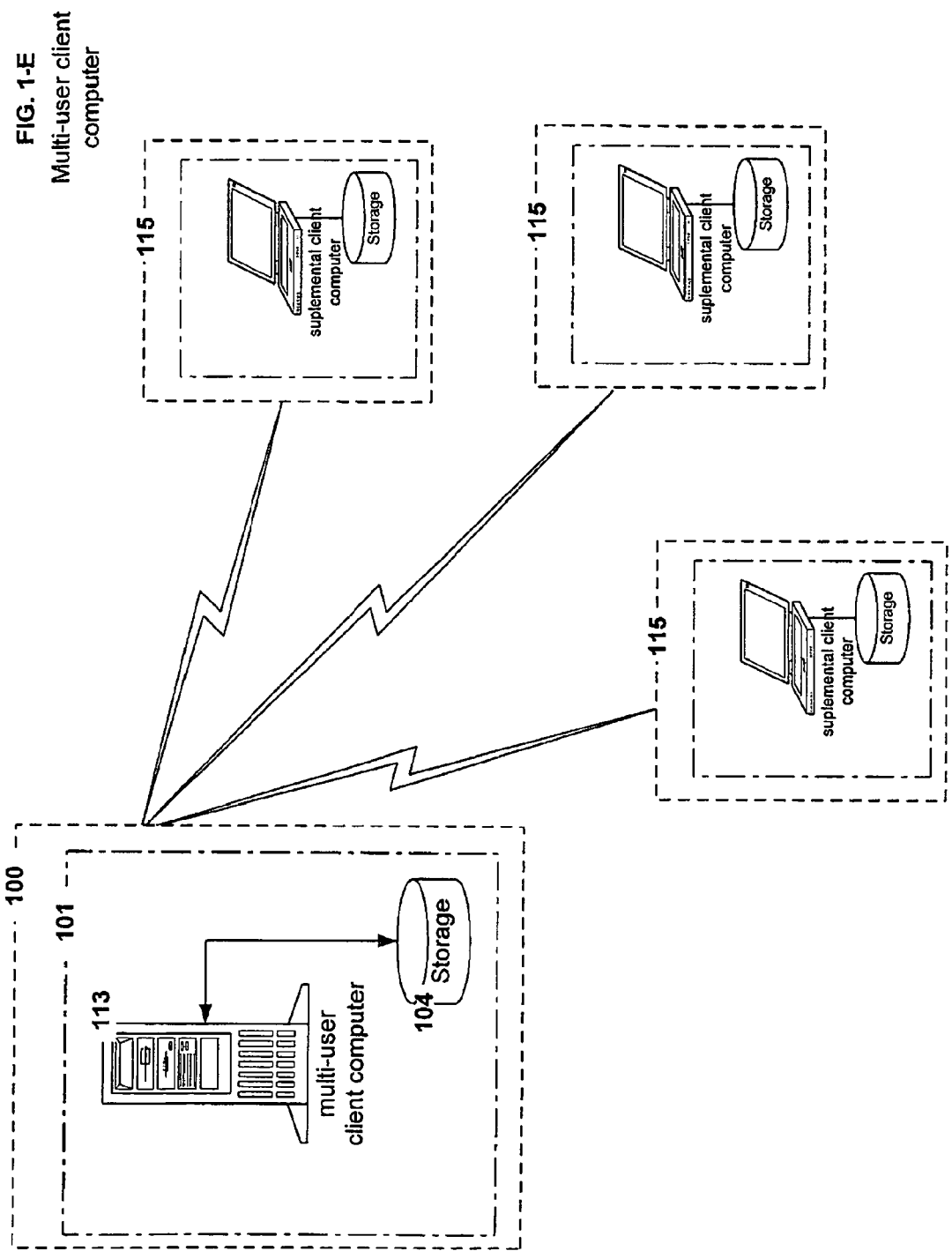

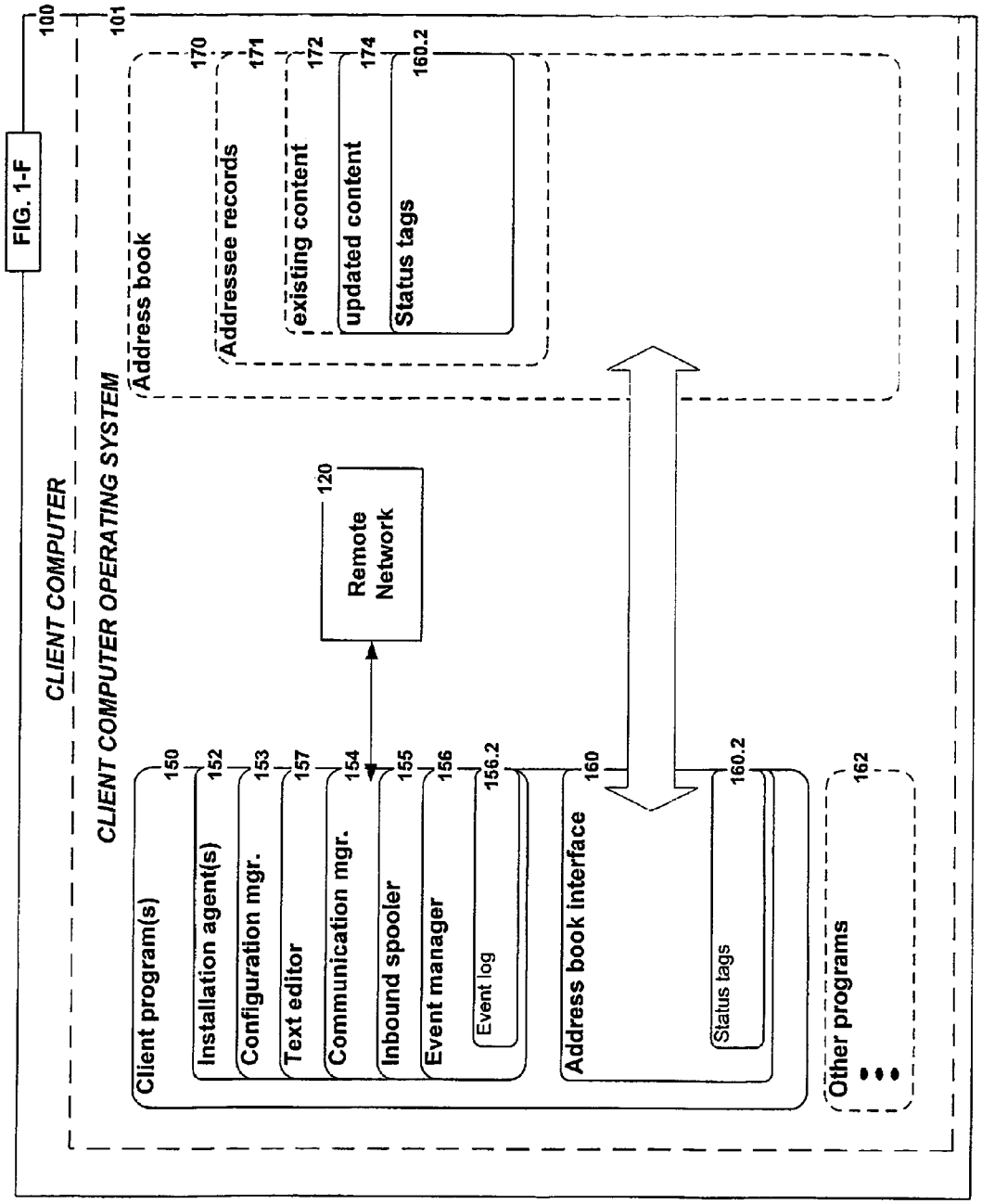

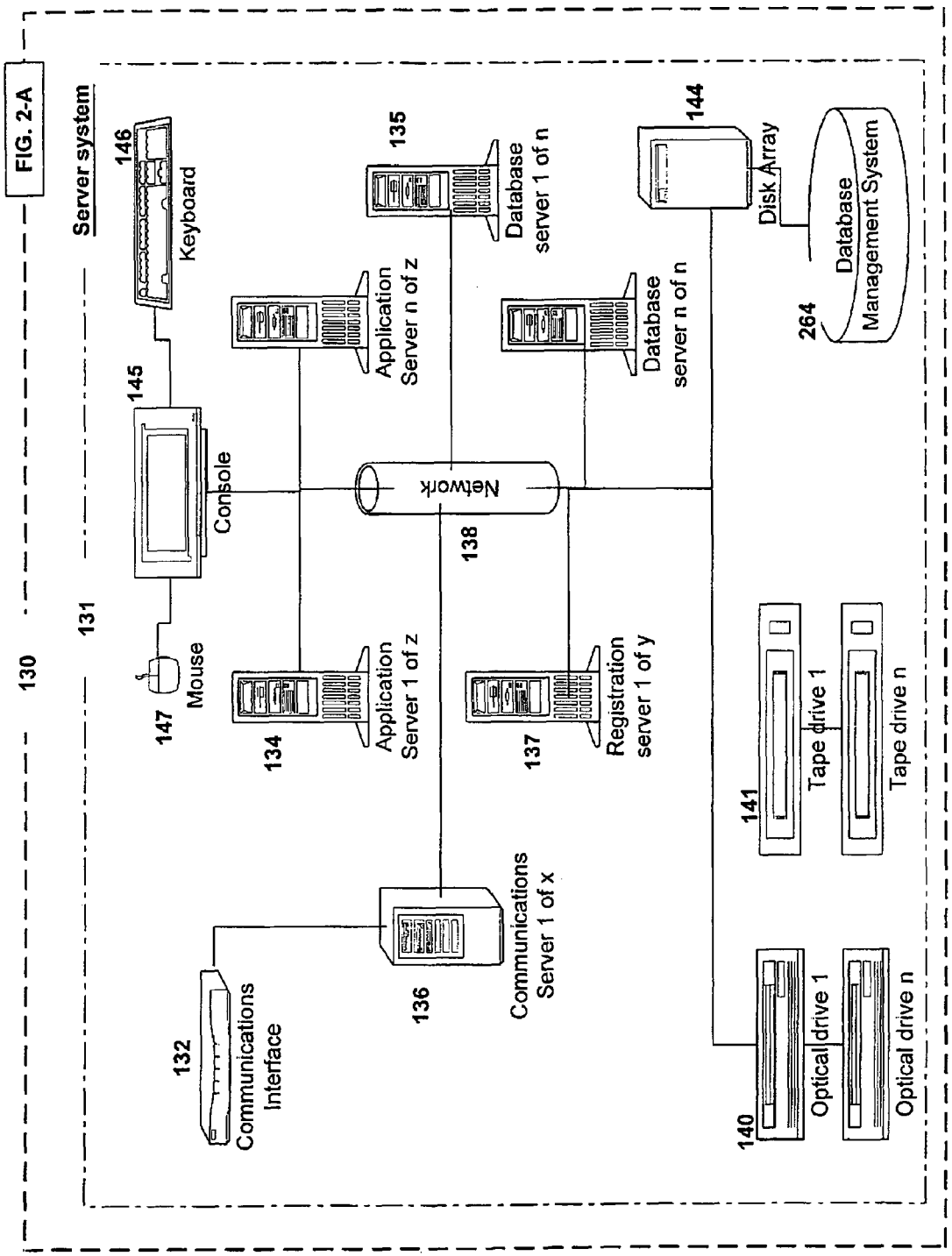

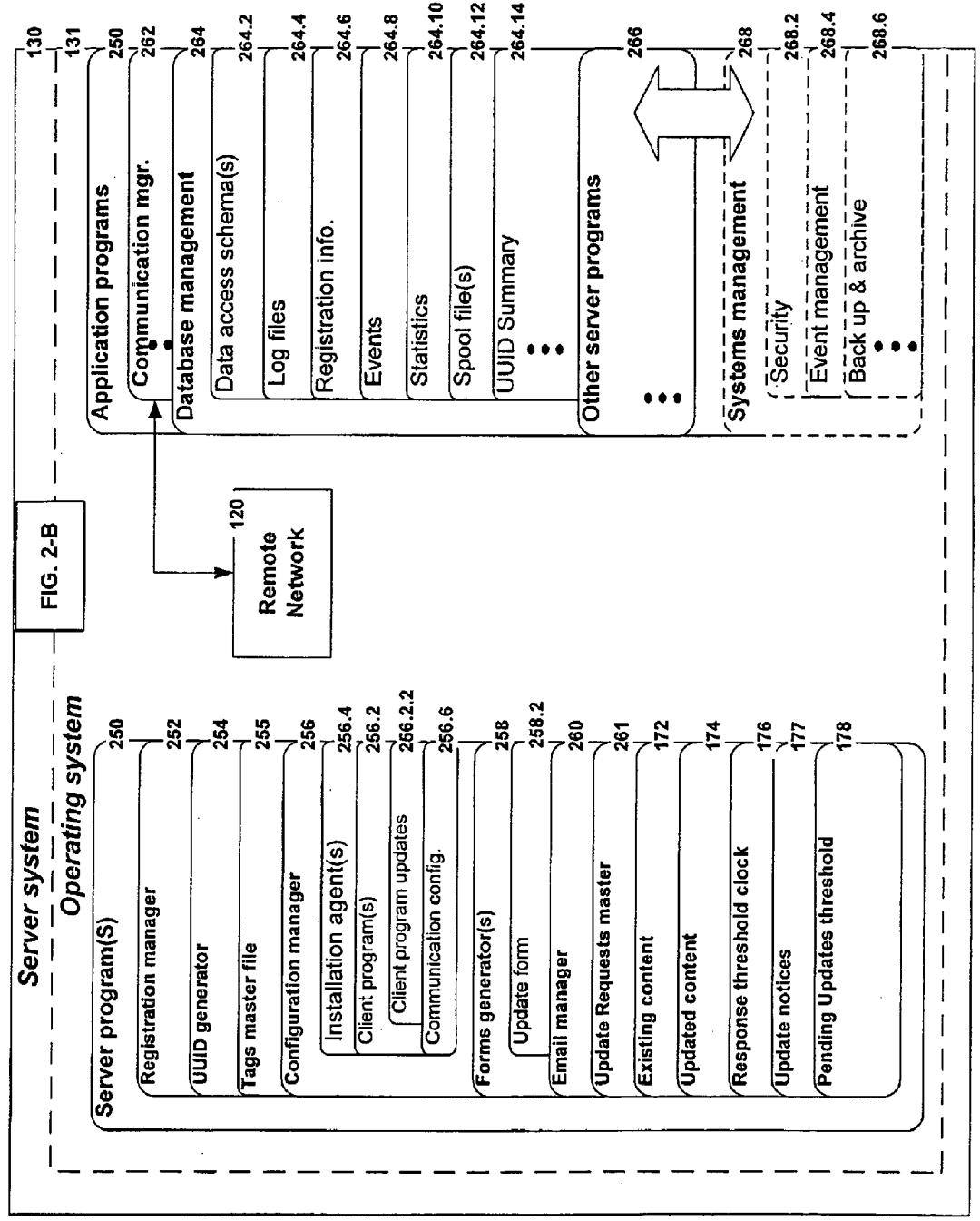
FIG. 2-B

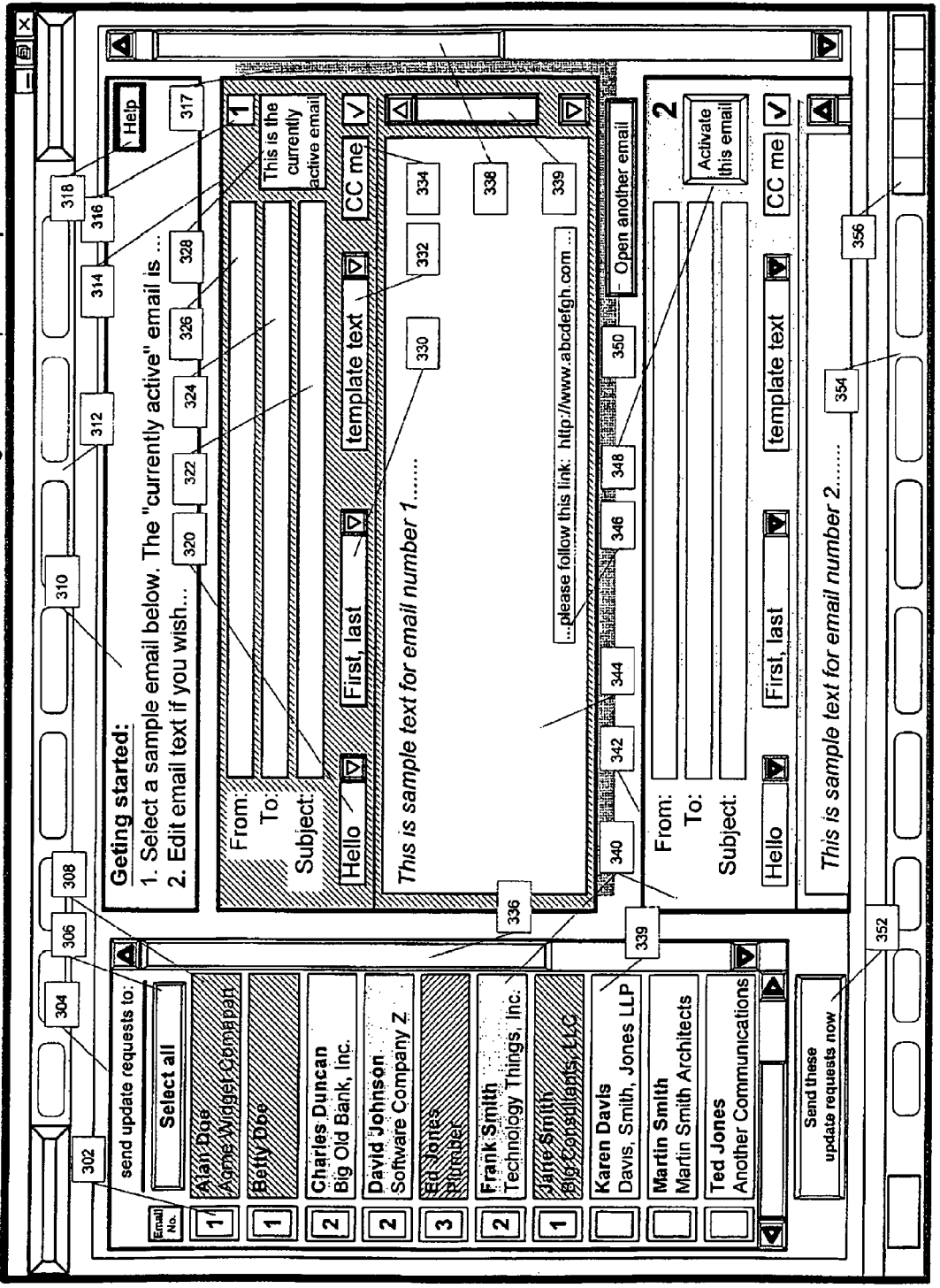
Fig. 3-A    Update Request Generation Form

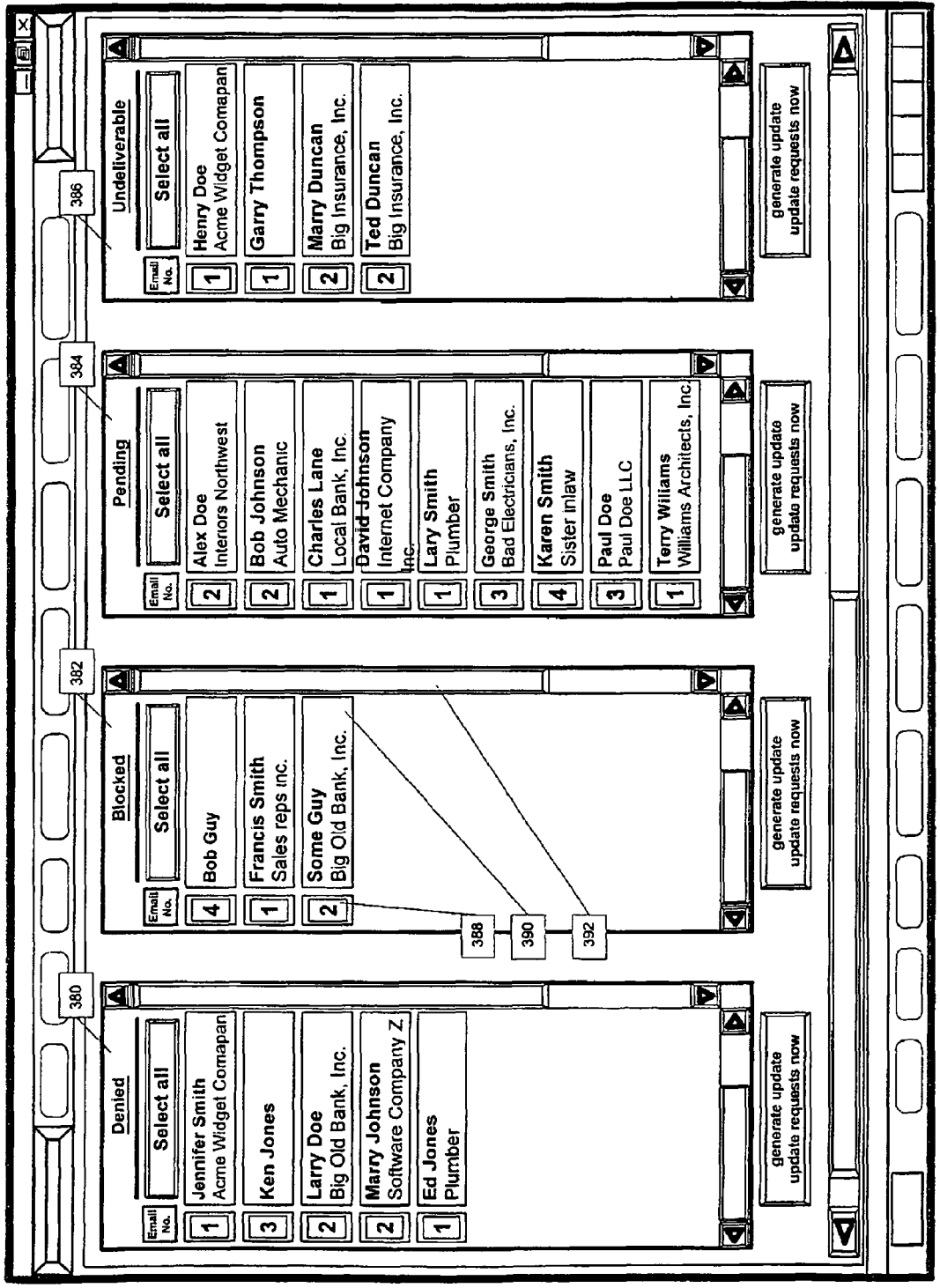

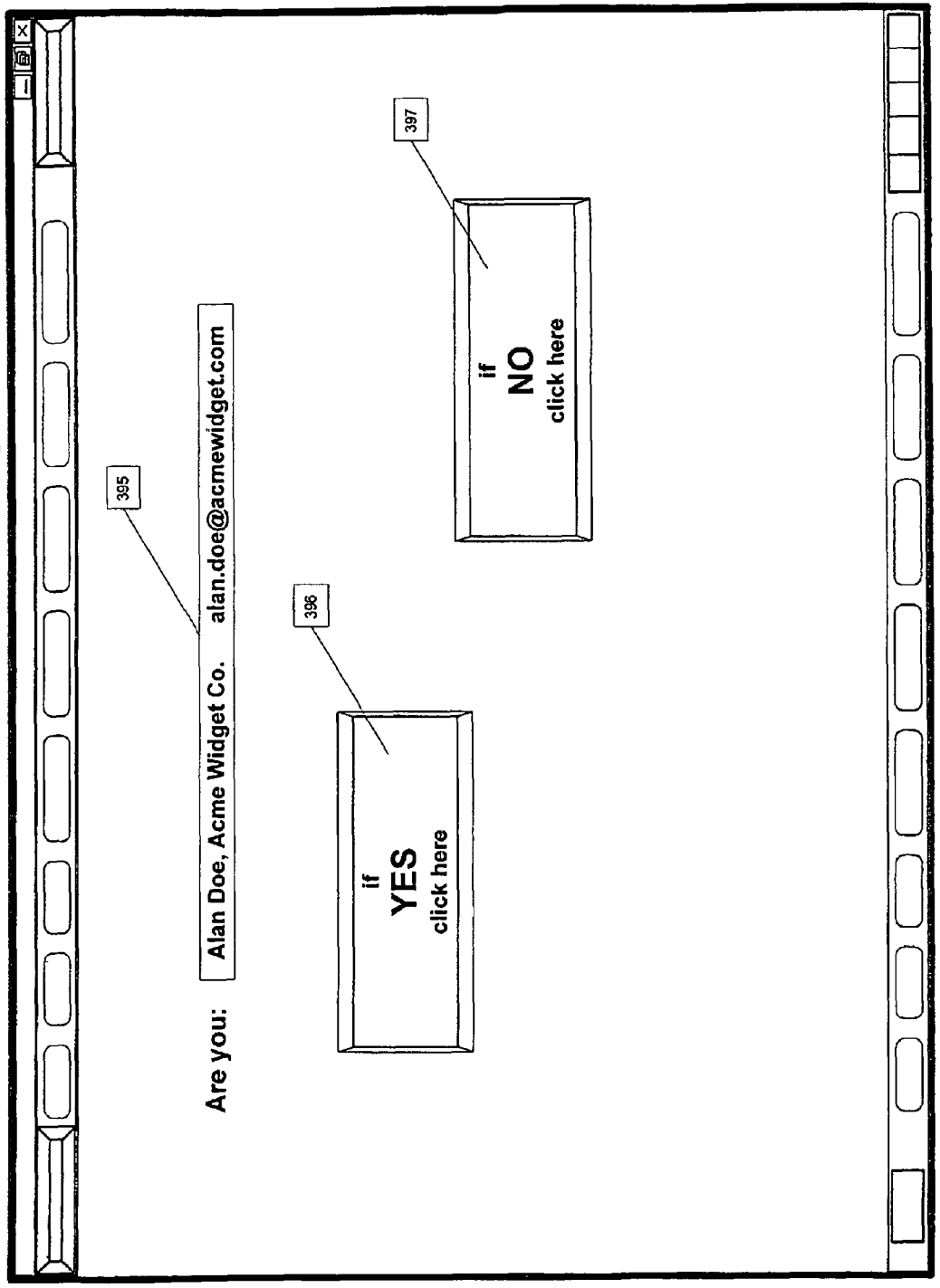

Figure 3:
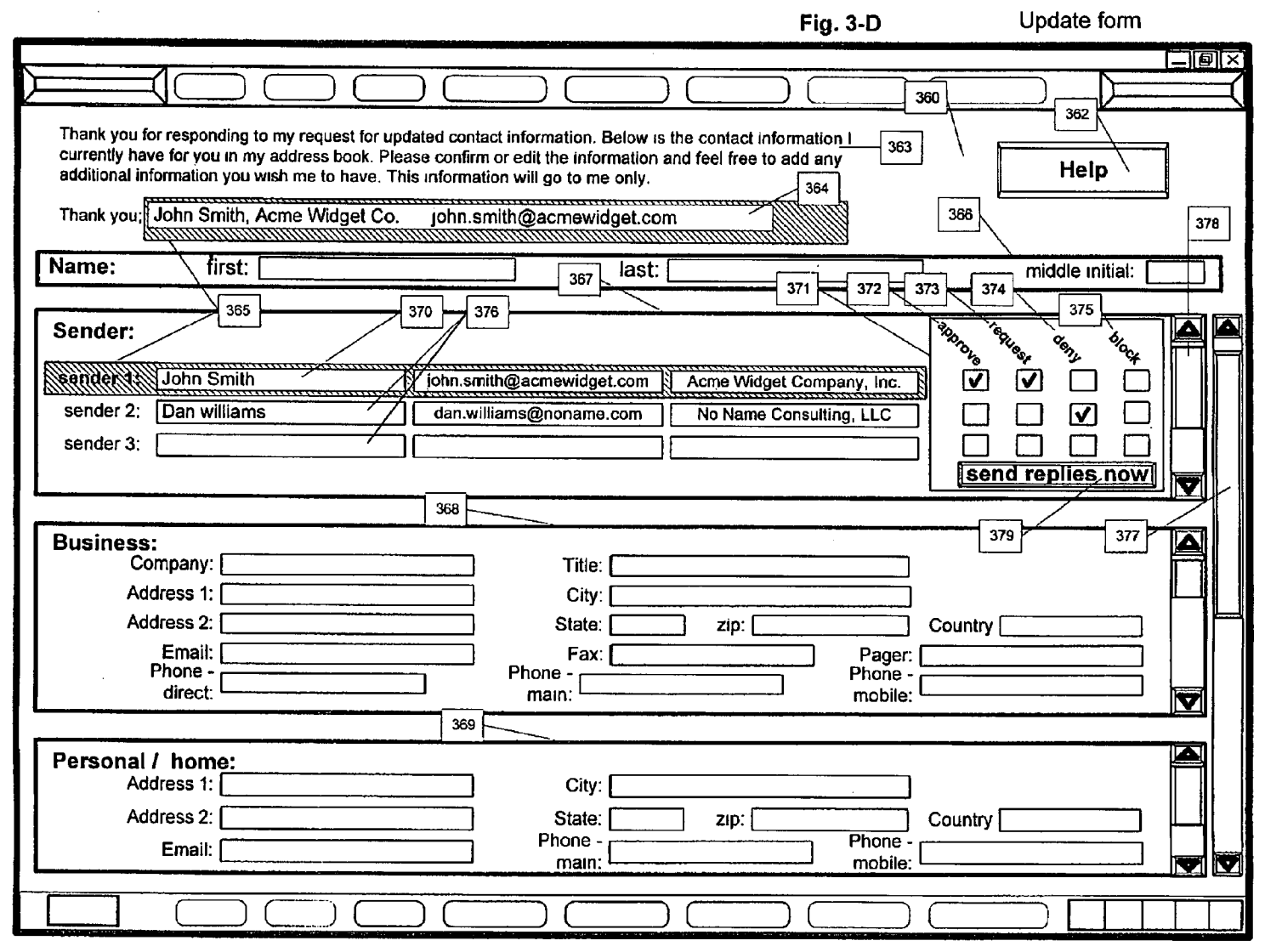

Fig. 3-D        Update form

Thank you for responding to my request for updated contact information. Below is the contact information I currently have for you in my address book. Please confirm or edit the information and feel free to add any additional information you wish me to have. This information will go to me only.

Thank you: John Smith, Acme Widget Co.    john.smith@acmewidget.com

Help

Name: first: [ ] middle initial: [ ] last: [ ]

Sender:
- sender 1: John Smith — john.smith@acmewidget.com — Acme Widget Company, Inc.
- sender 2: Dan williams — dan.williams@noname.com — No Name Consulting, LLC
- sender 3:

approve  request  deny  block
  ☑      ☑       ☐     ☐
  ☐      ☑       ☐     ☐
  ☐      ☐       ☐     ☐ send replies now

Business:
Company: [ ]
Address 1: [ ]
Address 2: [ ]
Email: [ ]
Phone - direct: [ ]      Title: [ ]
                         City: [ ]
                         State: [ ]      zip: [ ]
                         Fax: [ ]        Pager: [ ]
                         Phone - main: [ ]   Phone - mobile: [ ]
                         Country: [ ]

Personal / home:
Address 1: [ ]
Address 2: [ ]
Email: [ ]
                         City: [ ]
                         State: [ ]      zip: [ ]
                         Phone - main: [ ]   Phone - mobile: [ ]
                         Country: [ ]

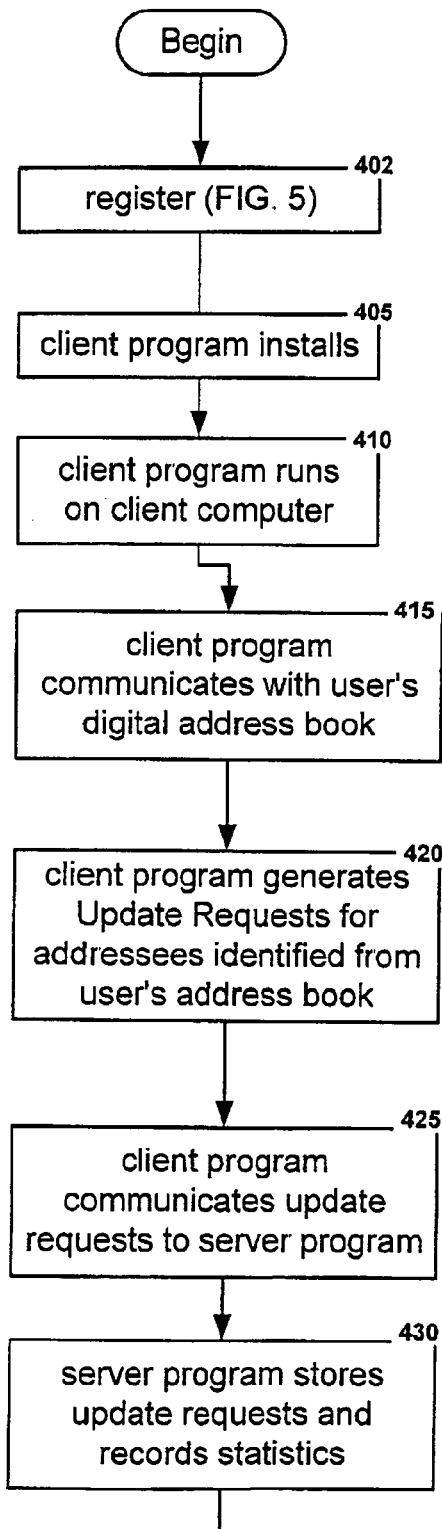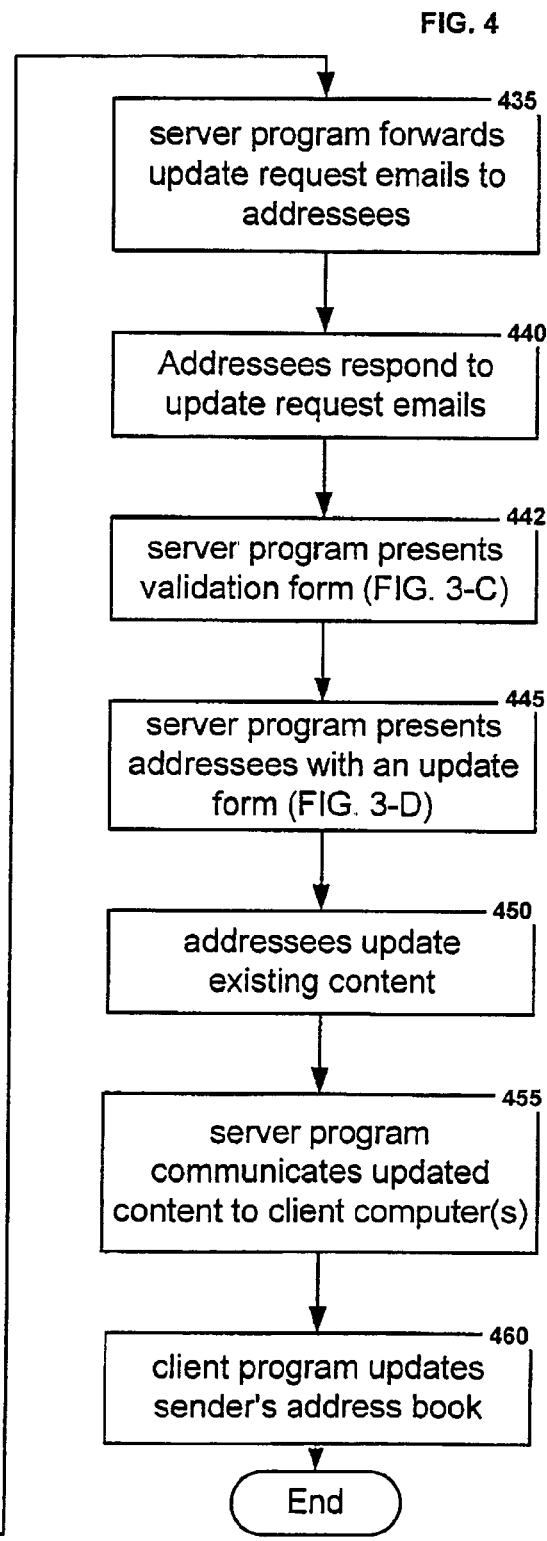
FIG. 4

Registeration &
user account setup

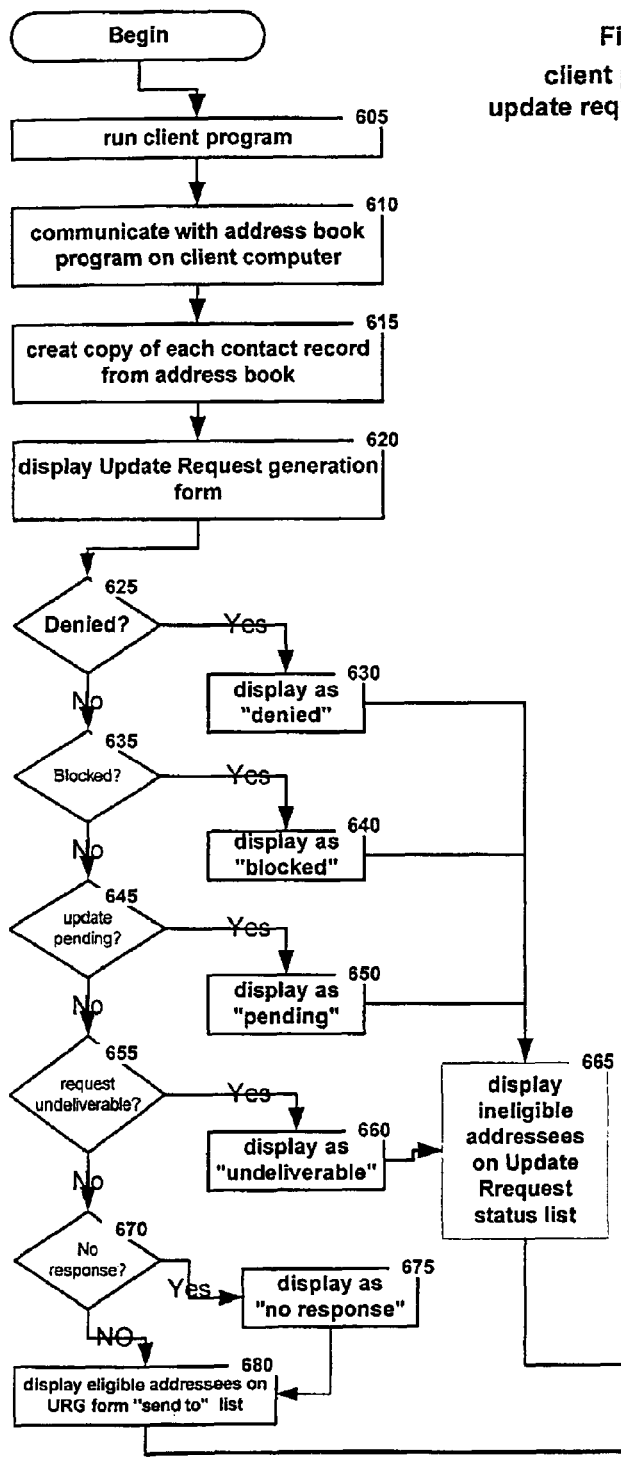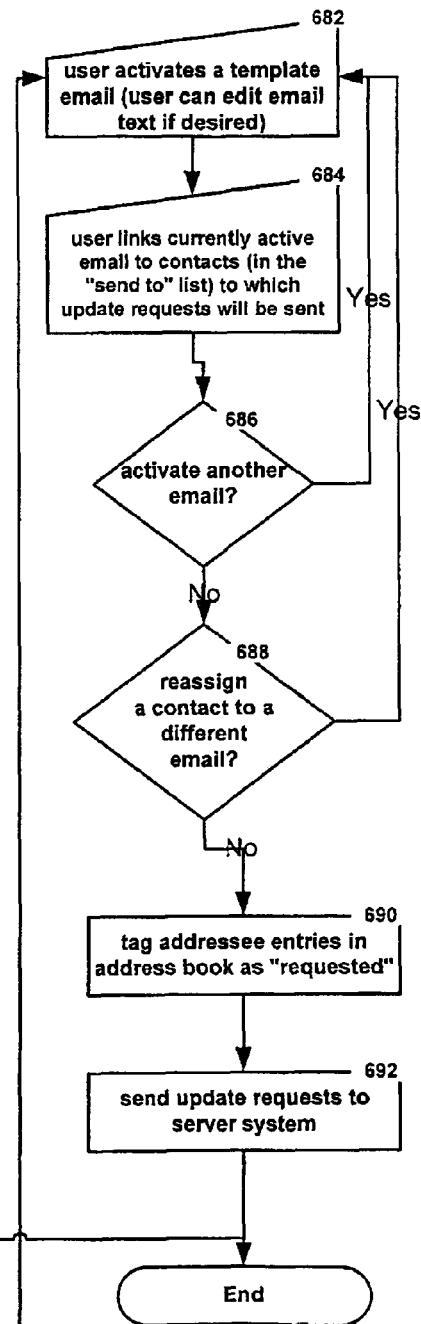
Fig. 6
client program
update request process server program
update request process addressee update processing client program
update processing

AUTO UPDATE UTILITY FOR DIGITAL ADDRESS BOOKS

CROSS-REFERENCE

This application is a continuation of U.S. patent application Ser. No. 14/077,178, filed on Nov. 11, 2013, which is a continuation of U.S. patent application Ser. No. 13/245,728, filed on Sep. 26, 2011, now U.S. Pat. No. 8,601,022, which is a continuation of U.S. patent application Ser. No. 12/406,024, filed on Mar. 17, 2009, now U.S. Pat. No. 8,032,549, which is a continuation of U.S. patent application Ser. No. 09/969,503, filed on Oct. 1, 2001, now U.S. Pat. No. 7,505,974, which claims the benefit of U.S. Provisional Patent Application Ser. No. 60/236,872, filed on Sep. 29, 2000 and is a continuation-in-part of U.S. patent application Ser. No. 09/249,269, filed on Feb. 12, 1999, now U.S. Pat. No. 6,883,000, each of which is entirely incorporated herein by reference.

BACKGROUND

Management of business and personal contact information is a vital part of every business-person's life. People and businesses have not only a desire, but a need to stay in touch. Our contact information changes faster than ever before, making it exceedingly difficult for our contacts to keep in touch with us. So, while communication has never been easier, staying in touch has never been more difficult. There currently exists a significant market for manufacturers, developers and retailers of software and electronic hardware products that manage personal and business contact information. Anyone who uses email, instant messaging, a cellular/wireless phone, a PDA (Personal Digital Assistant), PIM (Personal Information Manager) a fax machine or a telephone with a speed dial feature (for convenience we label all of these types of applications and devices "digital address books" or "client computers" on a client/server computer network) knows the frustration of entering and maintaining accurate and complete information in these devices. Studies indicate that in excess of 30% of the records in a typical digital address book are inaccurate within 12 months.

There exists therefore, a substantial need for a system to reduce or eliminate the labor and errors associated with the entry and maintenance of contact-related information into a digital address book. This system provides a method to substantially reduce if not eliminate, for the user of the invention, the labor and errors associated with manual data entry and maintenance of contact information into a digital address book.

Systems to facilitate updating of digital address books have been developed that require both parties, both the sender of an update request and the addressee, to be "members" of a service provided on a server. There exists a need for a service where only the sender is a member of the service and the update requests can be directed to anyone, particularly any digital address book that acts as a client computer on a computer network accessible to the server. This system fills that need. The sender needs to be a "member" only to receive the software that extracts the entries from the address book, allows the sender to draft messages, attaches the messages to particular email addresses, processes the responses, and updates the address book. A benefit of this approach is that it makes it easy and desirable for users to promote use of the system to their contacts. The prior art systems facilitate the user sending invitations to join the system, but recipients must join before either the sender or recipient can benefit. With this system, both parties receive immediate benefit from the system even if only one party is a "member".

SUMMARY

The system provides users of digital address books, wireless telephones, Personal Information Managers, and other digital applications and devices ("digital address books") with a more efficient, more cost effective, more accurate, and less manually intensive method for entering and updating information stored in the device. Addressees of update requests need not have previously registered with the system. The system:

1. extracts existing contact records (i.e. addressee records) from a user's address book, and
2. provides a mechanism for the user to create and communicate and manage messages to addressees requesting their updated contact-related information, and
3. presents to addressees an editable electronic form displaying the contact-related information currently present in the user's digital address book, and
4. provides a mechanism whereby the addressee can edit, enter or delete certain information displayed on the electronic form, and
5. provides a mechanism whereby the addressee can deny the user's current request for updated contact-related information, and
6. provides a mechanism whereby the addressee can deny the user's current request and automatically deny the user's future requests for updated contact-related information, and
7. provides a mechanism whereby the addressee can deny the user's current request and automatically deny all user's future requests for updated contact-related information, and
8. provides a mechanism whereby the addressee can request contact-related information from the user, and
9. provides a mechanism whereby addressees' responses to the user's requests are communicated back to the user, and
10. provides a mechanism whereby the system monitors, identifies and alternately processes certain types of computer files and data structures such as computer viruses, and
11. provides a mechanism whereby the user's digital address book is automatically updated with the addressees' responses to the user's requests(s) for updated contact-related information, and
12. provides mechanisms whereby the user can view the current status (i.e. "update pending", "update denied", etc.) of his/her contacts, and
13. provides alternate mechanisms whereby users can deliver their requests for updated contact information to addressees.

In one aspect, the invention is a method for updating contact information in a network with client and server computers that involves automatically extracting contact information from an address book data structure and sending the extracted contact information to a server. The information that is extracted and sent includes an address. The server sends to the address a contact information update request. When a person at the addressee computer responds with updated contact information, the server receives the updated contact information and forwards it to the originating computer which automatically updates its address book data structure for the addressee. The originating client computer can be any type of digital address book that can communicate with a server. In a variation of this method, before the extracted contact information is sent to the server, some of the extracted information is presented on a display and the information is sent to the server only if affirmative user input is received in response. In a variation of this method, the system monitors and eliminates certain types of computer files and information, such as for example known computer "viruses", from being communicated to or from the client computer.

In another aspect, the invention is a method in a server on a network with client computers for presenting a user with a request for update of contact information in an editable reply form. The method involves receiving from a sender client computer existing contact information, including an address for an addressee, sending to the address a contact information update request, presenting to an addressee client computer an editable reply form containing the extracted contact information, receiving, in the editable reply form, updated contact information for the addressee and forwarding the updated contact information to the sender client computer. In one embodiment, the contact information update request is sent via email while the editable reply form is presented from a web page and the updated contact information is received at the web page. In an alternative embodiment, the editable reply form is presented as part of an email message and the updated contact information is received via an email reply. Receivers can add or delete addressee information that is not currently present in the addressee data structure record in the sender's computer. In other words, the sender can send an update request that includes only a name and email address, for example, and the receiver can then add a home address, product descriptions, links to a web site, etc.

In another aspect, the invention is a method in a network with client and server computers for users to block requests for updates of contact information. A client computer receives from a server a request for updated contact information directed to an address that reaches the client computer. Information about the request is presented on a display on the client computer and, in response to user input subsequently received, the client computer sends to the server a command to block the request and also block future requests. The server then establishes a block tag such that no future requests for updated contact information will be sent to the client address from the server until the block tag is removed.

In another aspect, the invention is a method in a network with client and server computers for a user to deny requests from a sender for updates of contact information. A client computer receives from a server, directed to an address that reaches the client computer, a request for updated contact information. The request includes a sender identifier. Information identifying a sender of the request is then presented on a display on the client computer. In response to subsequently received user input, the client computer sends to the server a command to deny the request and all future requests having the same sender identifier. The server then establishes a deny tag such that no future request for updated contact information having that sender identifier will be sent to the client address from the server until the deny tag is removed. In a variation on the method, before the client computer sends the command to the server, the server provides to the client computer a copy of existing contact information maintained in a data structure in the sender's digital address book. The existing contact information may be presented to the client computer either in the form of an email or as a web page that responds to a query from a web browser program on the client computer.

In another aspect, the invention is a method in a network with client and server computers for a user to respond to requests for an update of contact information with a counter-request for an update of contact information. When a client computer receives from a server a request for updated contact information concerning an addressee, the client computer presents on a display information identifying a sender of the request which is generated from a sender identifier received with the request. Then, in response to user input, the client computer sends to the server a counter-request for updated contact information concerning the sender. The information identifying the sender maybe the sender identifier received with the request or maybe more detailed information found in a lookup table using the sender identifier to find the more detailed information. The lookup table may be on the client computer or on a server. Once the server receives the counter-request, it sends to the original sender a request for updated contact information. In a variation of the method, the first request for updated contact information includes existing contact information associated with the addressee which was extracted from a digital address book data structure maintained by the sender. As described above, the existing contact information can be sent in an email or served from a web page.

In another aspect, the invention is a method in a server on a computer network to aggregate contact information update requests. The server receives from each of many client computers a contact information update request for a single addressee. Each update request has a sender identifier. The server automatically sends to the addressee a single update request that includes each of the sender identifiers.

In another aspect, the invention is a method in a server in a networked computer system for obtaining and providing updated contact information. When the server receives from a sender client computer a request for updated contact information with an associated address, the server sends to the address a request for updated contact information. The request can be sent by any means, including email to a client computer, email to a web-based email server, postal service, radio, television, etc. Then the server receives from a responding client computer a communication responsive to the request. The server then determines whether the responding client computer is associated with the address and, if it is, the server receives updated contact information from the responding client computer and automatically transmits the information to the sender client computer. In a variation of the method, the web page also provides to the responding client computer copy of existing contact information received by the server from the sender client computer. The communication responsive to the request may be received from a web browser program on the responding client computer to a web page on the server or from any network communication device, including a web-based email server. The updated contact information may be automatically written into the sender's digital address book.

Although the embodiments described below and in the claims refer to a "server" and one or more "client" computers, it is well known in the art that server functions can be integrated into a "client" computer such that a peer-to-peer architecture is implemented, one peer computer serving to another peer computer at each step.

BRIEF DESCRIPTION OF THE DRAWINGS

FIG. 1-A is an overall system diagram.

FIG. 1-B is a schematic diagram of a client computer of the system.

FIG. 1-C illustrates an alternate embodiment of a client computer of the system in the form of a portable computer.

FIG. 1-D illustrates another alternative embodiment of a client computer of the system in the form of a hand held computer.

FIG. 1-E illustrates an alternative embodiment of a client computer of the system in the form of a multi-user client computer incorporating a server computer system and a multiplicity of client computers.

FIG. 1-F illustrates a file system/data structure of the client computer.

FIG. 2-A is a schematic diagram of the server system of the system.

FIG. 2-B illustrates a file system/data structure of the server system.

FIG. 3-A illustrates a representative Update Request Generation (URG) form/screen. Users of the invention utilize an electronic form such as this to format and manage requests to addressees for updated contact information.

FIG. 3-B illustrates a representative status screen whereby users can view the current status of update requests.

FIG. 3-C illustrates an example Validation screen

FIG. 3-D illustrates a representative Update form. Recipients of Update Requests utilize such an electronic form to review, edit and otherwise respond to the sender's request for updated contact-related information.

FIG. 4 is a system level logic diagram.

FIG. 6 is a block diagram illustrating representative client program functions for generating Update Requests.

DETAILED DESCRIPTION

Figure 5:
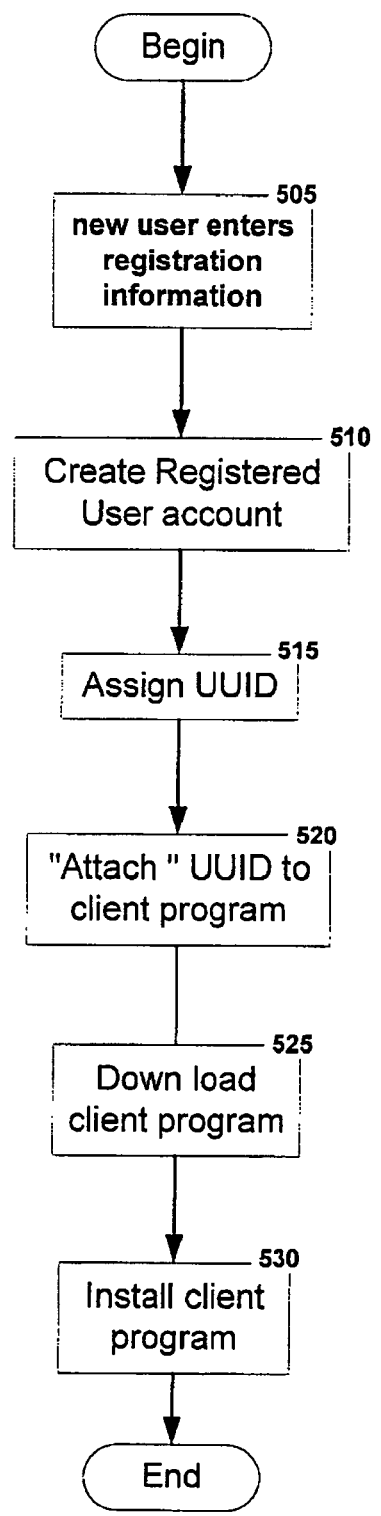
FIG. 5 is a block diagram illustrative of the user registration process.

SYSTEM ARCHITECTURE: In a representative embodiment of the system, a "mostly connected", client-server architecture is provided, though not required, for the delivery of business and personal contact and contact-related information. The representative embodiment is "mostly connected" because the local or "client" computer communicates with the remote or "server" computer via a "continuous" network connection. The client computer and the server computer may only communicate for brief periods of time even though they are both connected to the remote network (i.e. the Internet). The client program running on the client computer may communicate with a sever program running on a server computer whenever the user of the local or client computer connects to the remote network (i.e. the Internet) either specifically to communicate with the server system or to perform other functions. Such "other functions" might include, for example, shopping for goods, trading stocks, checking email, or reading an on-line version of a newspaper on the World-Wide-Web (hereinafter referred to as "the web"). The communication session between the client computer and the remote network is typically, though not necessarily, a continuous network connection. Alternatively, the initiation of the communication session with the remote network (i.e. the Internet) may be caused by manual input from the user or the communications session may be initiated automatically by the client program based upon certain criteria such as, for example, a period of I/O inactivity or idleness (similar to a "screen saver" as is well known in the art) or other parameters such that the user is not required to manually initiate the communication process.

THE CLIENT COMPUTER: The user of the system uses a client computer to run the client program and to run a digital address book application and to communicate with the server system. The client program has communications facilities to allow client computers to connect to and communicate with the server program(s). Additionally the client program contains interface programs to communicate with other programs located on or accessible by the client computer such as digital address book applications. In the representative embodiment, the client computer is remotely located with respect to the server system. Typically, there are many users, each with a client computer executing the client program and capable of communicating simultaneously with the server system. Herein the term "client" computer shall be used to represent any local computing device such as a hand-held "palm top" computer, laptop computer, desktop computer, terminal, PDA (Personal Digital Assistant), PIM (Personal Information Manager), Network computer, wireless communicator (such as a cellular or satellite telephone), or a multi-user computing system, etc. which is capable of communicating with a remote or server computer via the remote network. The client computer may also, customarily (as is well known in the art), contain an output device such as a CRT or LCD screen or plasma display, a manual data entry device such as a keyboard, keypad, touch screen, voice recognition system, pen stylus, or other such manual input devices as are commonly known in the art. The client computer may also be equipped with an automated input device such as a bar code reader, magnetic stripe reader, "smart card" reader, MICR (Magnetic Ink Character Recognition) reader, OCR (Optical Character Recognition) reader, or other such automated data input devices as are well known in the art. It is likely that multiple client computers will be communicating with the server system simultaneously.

In the representative embodiment of the system, a client computer is used by each user and runs a client program. In an alternative embodiment of the system, the client computer is a multi-user computing system. Such a multi-user client system may consist of one or multiple server computers with multiple secondary client computers such that multiple users of the system can be supported by a system of client computers. The client computer has a secondary memory device, such as, for example, a hard disk drive or other non-volatile memory. The client program of the system is stored on the secondary memory device of the client computer and is executed by the client computer's processor. It will be appreciated by one with skill in the art that the client program might be installed on the client computer from a number of sources such as, for example, downloaded over the Internet from a server, bundled with software provided by a third party software manufacturer (such as a Web browser provided by a Web browser manufacturer), manually installed from media such as CD ROM, etc. It will be appreciated that the client program will function in substantially the same manner regardless of the installation source or method. The representative embodiment of the system provides for downloading of the client program via the Internet for installation on the client computer.

The client computer has the capability to connect to the remote network. The client computer may connect to the remote network via a variety of methods such as a phone modem, wireless (cellular, satellite, microwave, infrared, radio, etc.) network, Local Area Network (LAN), Wide Area Network (WAN), or any such means as necessary to communicate to a server computer connected directly or indirectly to the remote network (i.e. the Internet). The term "wireless" as used in an embodiment of the system is defined by the capability of the system to transmit digital information from one device to another without use of cables.

It will be apparent to one with skill in the art that the operating system for the client computer could be either a single user operating system such as Microsoft DOS or Microsoft Windows or it could be a multi-tasking/multi-threaded operating system such as Unix or Microsoft Windows NT.

It will be appreciated by one with skill in the art that although the terms "client" and "server" are used herein, the architecture of the system is not limited to what is known in the art as a client/server network.

THE NETWORK: As used herein the term "remote network" is used to describe any public network such as the Internet or World Wide Web or any public or private network as may be developed in the future which provides a similar service as the present Internet.

THE SERVER SYSTEM: The client program periodically communicates with a server system. Used herein the term "server" computer is used to describe any computing device that stores and runs a server program. The server system facilitates the collection and distribution of content to and from a multiplicity of client computers.

In the representative embodiment of the system, the server system is comprised of a number of application servers (running application software programs) connected to a number of database servers (running database management software). Each server computer consists of one or multiple high speed CPU's (Central Processing Unit(s), primary memory (i.e. RAM) and secondary storage device(s) (i.e. hard disk drives). In the representative embodiment of the system, the server computer(s) run one of a variety of multi-tasking, multi-threaded, multi-user operating systems such as, for example, Microsoft Windows NT, Unix, Linux, etc. Together the application software, the database management software, the associated server computing hardware and operating software, and the communications hardware and software, comprise the server system. The application programs, operating system and the database management programs may all run on the same computing device as in a traditional "main frame" type of configuration or several, individual yet interconnected computing devices as in a traditional "multi-tier client-server" configuration as is well known in the art. The server system is coupled to the remote network (such as the Internet). The server system executes a (or multiple depending on the server system configuration) server program(s). The server system and the client program have communications facilities to allow client computers to connect to and communicate with the server program(s) such that the server program(s) can communicate with and exchange information with a multiplicity of client programs. It will be appreciated by one with skill in the art that the operating system for the server system advantageously is a multitasking/multi-threaded operating system, but could be a single tasking/single threaded operating system.

CONNECTING TO THE REMOTE NETWORK: The user causes the system to establish an electronic (either wire or wireless) connection with the Internet (or other such remote network as described herein). The method(s) for establishing communication with another computer via the Internet is well known in the art. Typically, the client computer is connected either directly via hardware Network Interface Card or via dial up phone or cable modem to a private local area network (LAN) or wide area network (WAN) which has at least one server connected to the World Wide Web or the Internet. Often, the private network and server connection to the web are provided by an Internet Service Provider or "ISP" and the user "dials" into the ISP's network via phone modem. The client computer also runs a program called a "web browser". This web browser is used to interpret Uniform Resource Locators (as are well known in the art) which represent the Internet or IP addresses of other computers and resources connected to the web. The browser navigates the web and facilitates communication with devices attached to the web and interprets web pages into a form readable on the client computer. The server system of the system has a known IP (Internet Protocol) address which is known by the client program. Once the client computer has established a communication session with the remote network, then the client program can establish a communication session with the server program using the appropriate protocols of the remote network (i.e. Internet Protocol).

CAUSING CONNECTION TO THE SERVER SYSTEM: In the system, the client program will cause the client computer to establish an electronic communications session with the server system as a result of one of a multiplicity of conditions. It will be apparent to one with skill in the art that there are many ways to cause the communication connection between the client computer and the server system such as, for example; by the user actively selecting a command from a menu, by running a web browser software, as is commonly known in the art, by the passage of time, or by numerous other conditions. For example, in one embodiment, the user establishes a connection to the Internet for the purpose of checking email. Once the connection has been made to the Internet, the client program spawns an additional process (as is well known in the art) and causes the client computer to establish a second connection with the server system. In another embodiment, the user enters contact information, such as a name and email address, into a digital address book application running on the client computer. Completing the entry of certain contact information causes the client program to establish a connection with the server program. In yet another embodiment, the client program monitors Input/Output activity in much the same manner as a "screen saver" (as is well known in the art) and waits for a period of inactivity. After a preset period of time has passed without the requisite I/O activity (keyboard activity, mouse activity, printer activity, network activity, etc.), the client program causes the client computer to establish a communications session with the remote server system. In another embodiment, the client computer monitors the elapsed time since the previous communication session with the server computer and when such elapsed time exceeds a defined limit, the client computer establishes a communication session with the remote server system via the remote network.

THE USER: A first-time user registers (on a one time basis) with the server system and provides certain contact information to the server system such as, for example, his/her first and last name and email address, etc. and thus becomes a Registered User. The terms "Registered User" and "user" are used synonymously herein. As used herein, the term "sender" is a sender of update requests and is equivalent to a user or registered user. In the representative embodiment, a user also provides certain information to the server system relative to the manufacturer and version of address book software (Personal Information Manager, Contact Management System, etc) (i.e. ACT version 5.0, Gold Mine version 4.1, Outlook 2000, etc.) in which the user would like his/her contact management data stored. It will be apparent to one with skill in the art that the client program might also automatically determine the manufacturer and version of the digital address book resident on the client computer and automatically make the necessary adjustments to communicate with the address book.

THE CLIENT PROGRAM: Once the user has registered with the server system, the client program is downloaded from the server system via the remote network or mailed to the user and installed on the client computer. The client program incorporates an information database or similar data structure and file management system for management of the client program(s), files, and data. The client program is made up of a multiplicity of programs that perform certain functions. These programs/functions include, but are not limited to, for example: an "INSTALLATION AGENT" to install and configure the client program(s), a "COMMUNICATION MANAGER" to manage the processes of connection and communication between the client computer and the server system. The client program also contains an "EVENT MANAGER" program which records and transfers (to and from the server system) all events (including entry of contact records, attempts to alter the client program, etc.) taking place on the client computer. The client program also contains an "ADDRESS BOOK INTERFACE" which manages the transfer of information between the client program and the records or other data structure of the user's address book application.

THE DIGITAL ADDRESS BOOK: As referred to herein, an "address book" is any digital application or device that stores contact related information such as names, phone numbers, email addresses, etc. in a data structure. It will be appreciated by one with skill in the art that there are a multiplicity of applications and devices such as wire-line and wireless telephones, fax machines, PDA's, email systems, Customer Relationship Management (CRM) systems, Sales Force Automation (SFA) systems, Human Resource systems and numerous other applications and devices that typically store and manage contact-related information.

EXISTING CONTENT: Existing content, as used herein, is the existing information that is stored in the address book application before it has been updated.

UPDATED CONTENT: Updated content, as used herein, is content that has been updated by a recipient/addressee.

UPDATE REQUEST: An update request, as used herein, is a request by a sender delivered to an addressee, typically via email, requesting updated content.

RECIPIENT: A recipient, as used herein, is any person or system that receives an Update Request.

ADDRESSEE: An addressee, as used herein, is any person to whom an update request is addressed.

SENDER: A sender is equivalent to a "user" of the client program. Senders send update requests to addressees/recipients.

STATUS TAG: Status tags are utilized by the system to indicate the status of contacts and/or update requests. For example, the recipient (addressee) of an update request has a multiplicity of options regarding responding to the update request. For example, if the recipient does not want to provide updated content to the sender, then the recipient can respond by "denying" the sender's update request, in which case the addressee's record in the user's address book will be marked with a status flag of "denied".

Process Description

Once the client program has caused the user's client computer to establish an electronic communication session with the server system, regardless of the process that caused the connection (i.e. manual or automated), the client program then passes the stored update requests to the server system. The client program also passes information contained in other files such as the log file, the statistics file, the configuration file and others, described in greater detail herein, to the server system. The server system checks addressee records to determine if a "deny" or "block" or other tag is present for a recipient. If a deny or block tag is present in the addressee's record, then the server system will not forward the update requests to the addressee. If the addressee has received a number of update requests (as determined by the server program, but typically 3 requests) in a prior period of time (as established by the server program, but typically a 24 hour period) then the server program will hold update requests for each addressee for which the multi-request threshold has been exceeded until the established threshold time period has expired (typically 24 hours). At this point the server system will bundle all update requests for an addressee together and deliver the multiple requests in one email with all senders identified in the email.

Prior to forwarding the update requests to addressees, the server program attaches text to each update request email which contains, among other things, a URL which the recipient can use to respond to the update request. An addressee receives the update request(s) (typically via email, but other methods are provided for in alternative embodiments of the system) and responds by clicking on a link (a URL) contained in or attached to the email. The server program validates that the recipient is the intended recipient and then displays an update request form (a web page) via which the recipient can confirm, edit or add to the presented ("existing") content (i.e. the information which the sender has about the addressee in the sender's address book). The recipient can also deny the sender's request, block further requests and/or request that the sender provide reciprocal content (i.e. the sender provides the recipient with the sender's contact-related information). The server system then stores the recipient's response (i.e. updated content) until the next time the client program communicates with the server program. The client program communicates with the server program on a periodic basis (typically every 24 hours) to deliver Update Requests to the server program and to receive completed Update Requests (i.e. "Updated Content") from the server program. The server program then communicates the Updated Content to the client program which in turn updates the user's address book.

The server system also passes update information to the client program. Program updates (patches, bug fixes, new features, etc.) are sent to the configuration file. New communications parameters such as modem configurations, access phone numbers, device URL's, etc. are also downloaded to the configuration file. The information downloaded from the server system to the client computer is often referred to herein as "inbound information". Once all the appropriate information (inbound information) has been downloaded from the server system to the client computer, the server system terminates the communication session with the client program. The client program will then cause the appropriate updated contact content to be stored in the appropriate locations within the user's designated address book. The user can then use the address book as usual to create, edit, store, retrieve, output, and otherwise manipulate business and personal contact information. The configuration, statistics, and ad control information are stored in their respective files as well. It will be appreciated by one with skill in the art that many of the processes described herein can be executed as serial processes, as parallel processes and as background processes and combinations thereof.

Process Overview
I. User Registration:
  1. New user registers at web site
  2. Registered user is assigned a universal user identifier (UUID)
  3. Client program downloaded to client computer
  4. Client program installed on client computer
II. Preparation of Update Requests:
  5. Client program runs and communicates with the address book program on the client computer.
  6. Client program extracts and displays on a request screen identification information about the contacts represented in the address book. Identification information may be, for example, first and last name of the contact and company name. Optionally, the client program may also display additional existing content about the contact such as, for example, email address and mailing address, etc and the client program may assemble and display information about the contact extracted from the client program database.
    a. if an assembled addressee record contains a status tag of status "denied", then addressee information is displayed on a status screen as "denied".
    b. if an assembled addressee record contains a status tag of status "blocked", then addressee information is displayed on a status screen as "blocked". A similar procedure applies to other addressee records with status tags such as "pending", "undeliverable", etc.
  7. From a request screen, the user selects email addresses to which update requests will be emailed.
    a. If an addressee record is marked as "denied" or "blocked", then the client program will not allow the addressee to be "selected" and no email communication will be sent by the client program.
  8. User selects template text to include in the update request email.
  9. User can edit template text or create their own message.
  10. User associates/links email text to selected addressees
    a. User can "reassign" an email text to a different addressee or group of addressees or all addressees.
  11. User causes the client program to send the update requests to the server program.
    a. Server program records information and statistics about the update requests such as:
      i. Date and time update requests sent
      ii. Addresses to be mailed to
      iii. Copy of the text contained in the email (update request)
      iv. Sender identification.
      v. Success or failure of the email delivery
    b. The server program checks the server database for "deny", "block" and other status tags on addressee records and will not deliver update requests for those addressees with such tags.
    c. The server program checks the "multi-requests" threshold for each addressee to see how many update requests have been delivered to a recipient in a prior period of time. If the multi-request threshold has been exceeded then the server program will hold all further update requests for that addressee and bundle them for delivery at a later time in one delivery with multiple sender ID's.
    d. If the addressee is not tagged with a "deny", "block" or other status tag and the multi-requests threshold has not been exceeded, then the server system delivers the update requests to the addressee(s).
III. Completion of Update Requests:
  12. Addressee's computer receives the update-request email.
  13. The email text includes a link to a web page (or other presentation medium) which, if selected, will display to the addressee the addressee's contact information known to the sender—the information currently present in the user's (sender's) address book about the recipient/addressee (we will call this "existing content").
  14. The recipient opens the email (using any of a multiplicity of standard email clients) containing the update request.
    a. The email is addressed from the sender for identification purposes.
    b. The email may be sent to the addressee directly from the client computer or via the server system.
  15. Recipient (addressee) clicks on the link (or copies the URL into his/her web browser) present in the email text and is presented with a "validation page" which is a web page (or other presentation media) displaying identifying information (such as name and email address) of the intended recipient (addressee). The validation form allows the recipient to confirm that he/she is in fact the intended recipient.
    a. If recipient is not the intended recipient and is a registered user of the system, then the recipient is presented with an update page containing an update form with no existing content presented.
    b. If recipient is the intended recipient, then recipient is presented with an update page with existing content presented in the update form. The update page may include instructions and links to other web pages.
    c. Intended recipient can:
      i. edit existing content,
      ii. request reciprocal content,
      iii. deny the sender's request,
      iv. block further requests,
If "i", then:
  a. Recipient makes any necessary changes to existing content.
  b. Recipient indicates when he/she is finished (having edited the existing content or approving the existing content "as is").
  c. New/changed information about the recipient (updated content) is recorded by the server program.
  d. The server program prepares and sends a notice of pending update to sender.
  e. The sender's client program establishes a communication session with the server system.
  f. The updated content is communicated to the sender's client program.
  g. Client program updates records in the sender's address book with the updated content.
  h. Client program date and time stamps the updated content.
If "ii", then:
  a. if the addressee is a registered user, then, after the addressee has completed performing updates for the current update session, the server program sends an update request addressed from the addressee to the sender of the current update request.
  b. If the addressee is not a registered user, then, after the addressee has completed performing updates for the current update session, the server program leads the addressee through the registration process before sending an update request from the addressee to the sender of the current update request.

If "iii", then:
  a. The server program records a "deny" entry for that particular recipient for that particular sender.
  b. At the next client program-to-server program communication session, the client program will tag the addressee as "denied" for the sender so that the client program will not allow this sender to send an update request to this addressee at a later time. The "deny" entry is recorded in the user's address book and in the server program.
  c. The client program does not update the sender's address book with updated content for this addressee/recipient.

If "iv", then:
  a. The server program records a "block" entry for that particular recipient for all senders. The server system will not deliver any update requests to a recipient with a block tag regardless of identity of the sender.
  b. At the next client program-to-server program communication session, the client program will tag the addressee as "blocked" for all senders so that the client program will not allow this sender to send an update request to this addressee at a later time. The "blocked" entry is recorded in the user's address book or client program database and in the server program database.
  c. The client program does not update the sender's address book with updated content for this addressee/recipient.

System Components:

FIG. 1-A illustrates an exemplary configuration of the system. The representative embodiment is illustrative of an Internet or World-Wide-Web based automated Contact Information Updating system.

As shown in FIG. 1-F, the representative embodiment of the system provides for a computer based system that allows users of digital address-book applications 170 and/or client computing devices 100 such as, for example, computers, cellular telephones, wireless telephones, Personal Information Managers, etc. which store contact-related information 172 to automatically update the contents of the application 170 or client computing device 100 with updated content 174 by delivering by electronic means an Update Request Form (FIG. 3-A) to addressees as identified from the user's address book 170—whereby addressees view and/or edit the existing content 172 whereupon the user's address book application 170 or device 100 is then updated with updated content 174.

CLIENT COMPUTER: The client computer 100 is typically a personal computer as illustrated in FIG. 1-B, but may also be a multi-user computing system as illustrated in FIG. 1-E such as, for example, a client server system communicating with supplemental client computers 115 via a private network or via the Internet or other such network or a web server communicating with supplemental client computers 115 via the world wide web. Alternatively, the client computer 100 may be a portable computer such as a laptop or notebook computer as illustrated in FIG. 1-C or a wireless communicator or hand held device such as a cellular or wireless telephone, or PDA (i.e. 3-com's Palm Pilot) as indicated in FIG. 1-D. It will be appreciated by one with skill in the art that client computers 100 and supplemental client computers 115 could, alternatively, be configured in many different configurations suitable to varying technologies. It is common for users of client computers 100 (particularly portable or hand held computing devices to maintain information on a multiplicity of client computers. It is often desirable for the user of such multiple client computers 100 to synchronize or replicate the information contained on each of the multiple client computers such that all of the user's multiple client computers contain the same information. It may also be desirable that the user's multiple client computers 100 contain different sets of information such as, for example, personal contact-related information on one or multiple client computers and business contact-related information on different client computers and/or a subset of contact-related information such as, for example, names and phone numbers only on a wireless telephone, etc. Accordingly the system provides for utilization of a multiplicity of client computers 100 by a single user and multiple supplemental client computer(s) 115. Although the representative embodiment of the system discusses the use of one client computer(s), it will be appreciated by one with skill in the art that a supplemental client computer 115 may also be utilized to send and receive information directly to and from the server system. Alternatively, supplemental client computers 115 may send/receive information indirectly to/from the server system 130 via the client computer 100 as illustrated in FIG. 1-A. Client computers 100 may be configured as multi-user client computing systems FIG. 1-E such as Internet, Intranet or Web systems as commonly known in the art.

As illustrated in FIG. 1-B, the client computer 100 includes a central processing unit (CPU) 108 to execute programs (including the client program) and manage the operation of the client computer 100. Primary memory 110 (i.e. high speed random access memory) is coupled to the CPU 108 and is used for temporary storage of programs and data, and a secondary memory device 104 (i.e. disk or optical storage) coupled to the CPU 108 is used for non-volatile storage of programs and data. A removable media storage 106 (i.e. floppy disk or CD ROM or optical disk) is coupled to the central processing unit 108 for purposes of loading computer programs, including the client program, and data into the client computer 100 and for non-volatile storage of computer programs and data. Output device 102 (i.e. CRT or LCD panel) is also coupled to the CPU 108 and provides a user interface, and manual input devices 113, 114 and 116 such as audio input microphone, key board and mouse and automated input device(s), such as a bar code reader 118 or magnetic stripe reader(s) 117, coupled to the CPU 108 provide means for a user of the client computer 100 to input commands, data, etc. Other input devices such as, for example, touch screen, voice recognition with a microphone 113 for input, Optical Character Recognition, Smart Card reader, etc. are examples of alternative input devices for alternative embodiments of the system. A communications interface(s) 112 such as a phone modem or network interface card (NIC) is coupled to the CPU and provides a means for the client computer 100 to communicate with the server system 130 and other computers via the remote network 120.

Although FIG. 1-A illustrates only 1 client computer 100 communicating with the server system 130, it is understood that the system is intended to support a plurality of client computers 100 (of a multiplicity of configurations) communicating with the server system 130 simultaneously. It will be appreciated by one with skill in the art that the type of computing device which comprises the client computer 100 and the type of device which comprises the communications interface 112 may be a variety of different devices and configurations and technologies and may be physically packaged as one or many distinct entities. For example, as illustrated in FIG. 1-C, the client computer 100 may consist of a laptop or notebook computer 113 (as is well known in the art) with a built-in, wireless modem which communicates to the remote network 120 via a supplemental digital or analog cellular, satellite, radio, or other such digital or analog communications network. Or, as illustrated in FIG. 1-D, the client computer 100 might consist of a hand-held Personal Digital Assistant (PDA) 103 or wireless telephone and communicate via a built-in cellular or satellite communications interface 112 to the remote network 120 via a satellite-based or cellular or radio based communication system. The spirit of the representative embodiment of the system is to provide for a client computer 100 that is capable of providing adequate processing power and storage for programs and/or data and which will communicate with a remote server system 130 via a remote network 120. As illustrated in FIG. 1-E, it is desirable and advantageous that the client computer 100 be a multi-user system capable of supporting a multiplicity of users via supplemental client computers 115.

The communications interface 112 might, alternatively, be a network interface card (NIC) which communicates with a Local Area Network (LAN) or Wide Area Network (WAN), or the like, communicating via TCP/IP or X.25 or other such network protocols, which in turn communicates with or is coupled to the remote network 120. Alternatively, it is also desirable and advantageous that the client computer 100 be highly mobile (i.e. battery powered, hand-held, etc.) and capable of wireless communication with the server system 130.

THE REMOTE NETWORK: The client computer 100 is located remotely from the server system 130 and communicates periodically with the server system 130 via the remote network 120. Alternatively, the client computer 100 communicates via a dedicated connection to the remote network 120 such that the client computer 100 can communicate with the remote network 120 at any time without having to establish a new communication session with the remote network. In the representative embodiment of the system, the remote network 120 is the Internet or World Wide Web (herein referred to as "the web"), but it will be appreciated that the network may be any such communications network, either public or private or a combination, which provides computer-to-computer communications between a plurality of client computers 100 and the server system 130. While FIG. 1-A illustrates one client computer 100 communicating with the server system 130, it is understood that the system provides for many client computers (in any multitude of configurations) to communicate simultaneously with the server system. A communication session is established between the client computer and the server system 130 by causing the client computer communications interface 112 to establish an electronic dialog with the server system's communications interface 132 via the remote network 120 (i.e. the world wide web or the Internet).

THE SERVER SYSTEM: As shown in FIG. 2-A, the server system 130 is coupled to one or more remote networks 120 via one or more communications interface devices 132 and one or more communications servers 136. The server system 130 receives, stores, transmits and otherwise manages update requests (FIG. 3). As shown in FIG. 2-B, the server system 130 also receives, stores and transmits other information to and from client computers 100 such as statistics 264.10, log files 264.4, event logs 264.8 and other such information that is advantageous to the proper operation of the system as described herein.

The representative embodiment of the system provides for a multi-tier architecture for the server system 130. As such, server system 130 is comprised of a plurality of high performance servers 134-137 coupled together via a high-speed network 138. The representative embodiment of the system provides for a plurality of application servers 134, a plurality of database servers 135, a plurality of communications servers 136, and a plurality of subscription and registration servers 137. It will be appreciated by one with skill in the art, however, that Server system 130 could, alternatively, be configured in many different configurations suitable to varying technologies. For example, an alternative configuration might consist of one or multiple large server(s) performing multiple functions as in a traditional "main frame" configuration. Alternatively, the individual servers 134-137 of server system 130 could perform multiple functions such as application server and registration server in one physical entity. It is also understood that the devices which comprise server system 130 may be located in geographically dispersed locations or may all reside in one physical location.

SERVER COMPUTERS: The representative embodiment of the system provides for one or more registration servers 137 which accommodate first time users in registering to (as described herein) the server system 130. Database servers 135 support (i.e. execute programs and store data, accept inputs and produce outputs, etc.) the database management system 264 of the server system 130. Application servers 134 execute and store the application programs of the server system 130. Communications servers 136 provide communications connectivity between the server system 130 and client computers 100 via the remote network 120.

The individual servers 134-137 of server system 130 each, typically, contain the following components: one or more high speed CPU's, primary memory (i.e. high speed RAM), one or more secondary storage devices (i.e. high capacity hard disk drive(s)), removable media drives (such as CD ROM or tape) for loading and storage of programs and data, and one or more network interface card(s) or other such means to interface to the local high speed network 138. Additionally, connected to the local high-speed network 138, are a plurality of network devices such as high capacity, high-speed secondary storage devices 144 (such as hard disk drives), backup/archive devices 140 and 141 such as tape drives and/or optical disk drives for high capacity, high-speed loading of programs and data as well as archiving and backup of programs and data. One or more consoles 145 (or other such user interface devices such as a CRT), and keyboard 146 and mouse 147 are also provided for user control of the server system. The local network 138 is a high-speed, high-capacity Ethernet or other such-high speed, high-capacity network as to provide high-speed, high bandwidth computer-to-computer communications.

CONNECTION TO THE SERVER SYSTEM: Referring to FIG. 1-F, client program 150, based on one or more of a multitude of conditions, causes the client computer 100 to establish a communications session with the server system 130 via remote network 120. The client computer 100 contains a web browser (such as, for example, Microsoft Internet Explorer or Netscape Navigator) or other such Internet or remote network navigation technology and a communications interface 112 to facilitate communications via the remote network 120 to other computers capable of communicating via the remote network 120 and specifically, the server system 130.

The client program 150 is delivered to the user and installed on the user's client computer 100 with the pre-established URL of the server system 130. The client program automatically passes the pre established URL of the server system 130 to the web browser (or other such navigation and communication program) of the client computer 100 and causes the client computer 100 to establish a communications session via remote network 120 to the server system 130. It will be apparent to one with skill in the art that there are numerous methods by which the client computer 100 might initiate the communication connection between the client computer 100 and the server system 130. One such communication initiation method might be, for example, the user actively selecting a command from a menu such as "update contacts". Another communication initiation method might be, for example, the client program 150 causing the web browser (or operating system 101) of the client computer 100 to spawn an additional Internet connection while the client computer 100 is already communicating via the Internet and simultaneously performing other tasks. Yet additional initiation methods might be, for example, by the passage of time, by lack of input activity, or by numerous other conditions.

For example, in one embodiment, the user establishes a connection to the Internet (remote network 120) for the purpose of checking email. Once the connection has been established between the client computer 100 and the Internet (or World Wide Web), the client program 150 spawns (or causes the operating system, web browser or other such program of the client computer 100 to spawn) an additional process/connection (as is well known in the art) to the remote network 120 and causes the web browser or other such program of the client computer 100 to establish a second communication session simultaneous with the first communication session, the second communication session being a communication session between the client computer 100 and the server system 130.

In yet another embodiment, the client program 150 monitors Input/Output activity in much the same manner as a "screen saver" (as is well known in the art) might and waits for a period of inactivity. After a preset period of time has passed without the requisite I/O activity (keyboard activity, mouse activity, printer activity, network activity, etc.), the client program 150 automatically causes the client computer 100 to establish a communications session with the remote server system 130.

It will be appreciated by one with skill in the art that other automated "house keeping" tasks such as, for example, validating data, processing and reporting of errors, logging events, collecting statistics, etc. are also conducted by the client and server systems when communicating and/or transferring inbound and outbound information.

The preferred embodiment of the system may also, though not necessarily, execute processes (whether concurrent or sequential) as background processes to other processes taking place concurrently on both or either the client computer and/or the server system. It will also be obvious to one with skill in the art that the relative timing and sequence of the various functions performed by the client and server programs can be modified without altering the spirit or functionality of the system.

System Logic Overview:

For clarity, the movement of information (programs, files, data, etc.) between the client computer 100 and the server system 130 can be described from the perspective of the client computer. Information which is transferred (often referred to herein as "uploaded") from the client computer to the server system is often referred to herein as "outbound" information (programs, files, data, or other such digital information). Information which is transferred from the server system to the client computer (often referred to herein as "downloaded") is often referred to herein as "inbound" information.

FIG. 4 illustrates the basic processes of a representative embodiment of the system.

Step 402: A first-time user of the system registers with the server system and becomes a registered user (herein referred to as a user).

Step 405: The client program is downloaded via the remote network 120 and automatically installs on the client computer 100. Alternatively the client program is delivered by other means such as a CD ROM delivered via mail. Alternatively the client program is installed manually.

Step 410: The client program runs on the client computer. The client program can be run automatically based on a calendar schedule or other inputs. Alternatively a user can launch the client program by executing a command.

Step 415: The client program communicates with a digital address book on the client computer and identifies potential addressees.

Step 420: The client program 150 generates an Update Request Generation form as shown in FIG. 3-A which displays eligible addressees 308 and sample update request text (email text) 344 which can be edited and linked to selected addressees.

Step 425: Once the update request email contents have been linked to the selected addressees 308 the client program communicates with the server program and sends the update requests to the server system 130 via the remote network 120. Update requests include existing content. The client program 150 also communicates additional "outbound" information to the server system 130 such as, for example, with reference to FIG. 2-B, statistics for storing in a statistics data structure 264.10 on the server and log files for storing in a log files data structure 264.4 on the server.

Step 430: Upon receipt at the server, with reference to FIG. 2-B, the server program 250 stores a copy of the existing content in an existing content data structure 172 and a copy of the update request emails in an update requests master data structure 261 associated with each addressee. The server program 250 records the additional outbound information in the appropriate data structure (statistics 264.10 and log files 264.4., etc.).

Step 435: The server program 250 forwards the update request notifications to the addressees. As shown in FIG. 3-D which shows a screen display presented to an addressee, each Update Request Notification contains one or more requester identifiers 364, 370 and 376. The Update Request Notifications (notifications) are typically delivered to addressees via email. If the server program determines that a notification cannot be successfully delivered via email then the server program may attempt alternative methods of delivery such as, for example, fax, voice, or paper mail, as is well known in the art. Alternatively, the server program may attempt to locate a valid contact information for the addressee by automatically searching public directories such as, for example, "white pages" directories, as is well known in the art, available via the World Wide Web or by searching other public or private directories as may be accessible to the sever program.

Step 440: Addressee(s) respond to Update Request Notifications. Update Request Notifications contain an Update Request Notification Link which is a world wide web URL—Universal Resource Locator, as known in the art. The Update Request Notification Link 346 was presented to the sender as part of the draft notification text as shown in FIG. 3-A. The Update Request Notification Link 346 is "linked" to the Addressee Validation Form as shown in FIG. 3-C. If the notification is delivered via email, then the addressee can activate the link 346 by clicking on it, as is commonly known in the art, or by entering the link in the URL field of a web browser. If the notification is delivered to the addressee via alternative methods, then the addressee can view the Addressee Validation Form shown in FIG. 3-B by entering the link into the URL field of a web browser.

Step 442: Addressee is presented with the Addressee Validation Form shown in FIG. 3-C. If the recipient responds that the update request is someone other than the addressee by clicking the NO button 397, then an Event Trigger is activated. An Event Trigger can cause a multiplicity of actions such as, for example, presenting the recipient with an alternate web page, recording statistics about the event, etc.

Step 445: If the recipient confirms that they are the intended recipient (the addressee) by clicking the YES button 396, then they are presented with the Update Form shown in FIG. 3-D with existing content displayed in the update form.

Step 450: The addressee can elect to update the existing content by selecting the appropriate elements/sub-elements and entering the desired information. Alternatively, the addressee can take a multiplicity of alternate actions such as, for example:

a. Deny the update request.
b. Block further update requests.
c. Confirm the existing content.

Step 455: Once the addressee indicates that they have completed their update activities, the recipient's browser program sends the update to the server and the server program 250 communicates the now updated content to the sender's client program 150 during a subsequent communication session between the client program and the server program. The server program also records and communicates other information to the sender's client program such as, for example, Status Tags from the Tags master file data structure 255.

Step 460: As shown in FIG. 1-F, the client program 150 updates the sender's address book 170 by recording the updated content in the updated content data structure 174 and the appropriate status tags in the status tags data structure 160.2.

System Logic Detail

Steps 505 & 510: Establishing a Registered User Account:

Beginning at step 505 in FIG. 5, referring to FIGS. 2-A and 2-B, a first-time user of the system establishes communication with a Registration Manager 252 running on a Registration Sever(s) 137 for purposes of establishing a Registered User Account (herein often referred to simply as a "user"). The registration manager 252 presents the first-time user with a "Registration" screen. The first-time user creates a Registered User account, step 510. Certain information is required to establish a Registered User account and some information is optional. User account information may include, for example, name, company name, title, phone number, email address, etc.

Steps 515 & 520: Assign and Attach UUID:

Once the user has entered the required registration information they are considered a registered user (referred to herein as simply a "user"). The registration manager 252 creates a user account file containing registration information 264.6 and causes the UUID generator 254 to automatically generate a unique Universal alpha-numeric User Identifier (UUID) (step 515). The registration manager then assigns the UUID to the client program and assigns the same UUID to the user account file. A UUID is a unique identifier used by the server program 250 to identify each individual client program 150 and each user when the client program communicates with the server program. If the client program 150 is downloaded from the server system 130 via the remote network 120 then the server system assigns the UUID to the user at the time the user registers and the server system 130 downloads the client program 150 to the user's client computer 100. If the client program 150 is received by the user by means other than downloading via the remote network 120 then the UUID assigned to the client program is not associated with the user until such time as the first-time user establishes a communication session with the server system 130 and registers as described above.

Step 525: Download Client Program:

The server program 250 downloads the client program 150, step 525, to the user's client computer 100 and terminates the communication session between the user client computer 100 and the server system 130. The preferred embodiment of the system depicts an "always on" (i.e. constant) communication session between the client computer 100 and the remote network 120. For purposes of clarity and to address alternative embodiments, this document describes an embodiment which supports periodic communication sessions between the client computer 100 and the server system 130. It will be appreciated by one with skill in the art that it may be beneficial for the server system 130 to down load a client program 150 which is capable of operating on a variety of client computer operating systems 101 and of communicating with a wide variety of address books 170 (i.e. Act, Gold Mine, Outlook, Palm Pilot, Nokia, Motorola, etc.). Conversely, in the interest of efficiency, it may be beneficial for the user to select (or the server system to automatically assign), while on line with the server system, a client program 150 which is optimized specifically for one or a subset of operating platforms and is capable of communicating with just one or a subset of the possible address books 170 available. It will be appreciated by one with skill in the art that there are a multitude of viable methods for installing and configuring the client program 150 on the user's client computer such as, for example, downloading the client program 150 over the remote network 120 and automatically installing the client program 150 on the client computer 100 using an installation and configuration agent 152 (FIG. 1-F) or manually installing the client program 150 from a floppy disk, CD ROM, tape, DVD, etc. with the assistance of an installation and configuration script or wizard 152 (as is well known in the art). An installation and configuration agent 152 might, for example, accompany the client program 150 which could automatically configure and install the client program 150 on the client computer 100. The representative embodiment of the system provides for the automatic delivery, installation and configuration of the client program 150 via remote network 120 and an installation agent 152 and is but one example of how the client program 150 delivery, installation and configuration might be accomplished.

Step 530: Install Client Program

The client program 150 must be installed on the client computer 100 and properly configured before the registered user can operate the client program 150. The client program 150 includes a setup program/installation agent (or script) 152 which will determine if there is sufficient space on the storage device 104 (FIG. 1-B) of the client computer 100 on which to install the client program 150. When run, the setup program/installation agent 152 automatically creates the necessary directory(s), sub-directories, icon(s), etc. on the client computer 100. The installation agent typically automatically identifies client computer resources (such as drive and path names, modem configuration, CMS/PIM manufacturer and version, etc.) and automatically installs the client program. Alternatively, the installation script may prompt the user for information to assist in the installation such as modem type and speed, phone dialing procedures (i.e. access to outside dial tone), directory paths, address book information, optional functions, etc. The installation agent 152 then installs and stores the client program 150 and it's associated files and executable programs in the directory(s) and it's associated sub-directories. For example, the directory created by the installation agent/setup program might be labeled "Webbcard". The installation script/agent then creates a plurality of sub-directories (as are well known by one with skill in the art) such as, for example, a "Webbcard.bin" sub-directory for executable program(s) and associated DLL's, a "Webbcard.tmp" sub-directory for temporary files, etc. The installation agent might also create additional sub-directories for utilization by the client program at a later time. The installation and configuration agent 152 also creates other files necessary for the proper functioning of the client program such as, for example, a "status tags" file 160.2 (FIG. 1-F) for storage of update request status tags, an "event log" file 156.2 for tracking the performance of the client computer (i.e. errors, file corruption, communication statistics, etc.), etc. Examples of files created under the "inbound" sub-directory might include, for example, an "inbound spooler" file 155 for temporary storage of inbound updated content prior to transfer to the user's address book 170, a "configuration" file 153 which describes Universal Resource Locators, Internet Protocol (IP) addresses, and other parameters necessary for the client computer 100 to communicate with the server system 130. The setup program/installation agent 152 also determines if a previous version of the client program 150 has been installed and if updating of the previous version to a newer version is required. The system does not require that the entire client program 150 be installed all at once. The representative embodiment of the system allows for the client program 150 to be installed in sections.

Generating Update Requests (FIG. 6)

Step 605: The client program 150 runs on the client computer. The representative embodiment of the system depicts the client program 150 running on a multi-tasking client computer operating system 101, as is commonly known in the art, such that the client program 150 will run simultaneously with other programs 162 running on the client computer 100. Advantageously, the client computer operating system 101 would also be multi-threaded as is commonly known in the art. Also advantageously, the client computer operating system 101 would also be a multi-user operating system capable of supporting multiple supplemental client computers 115 and multiple users. Also advantageously, the client computer operating system 101 would provide a graphical user interface, as is commonly known in the art. The program 150 is launched automatically upon startup of the client computer 100. Alternatively the client program 150 can be launched via manual command according to the procedures of the client computer operating system 101. Alternatively, and advantageously, the client program is launched (as commonly known in the art) based upon conditional inputs caused by other events such as, for example, the launching of other programs such as the address book program(s) 170 with which the client program communicates.

Step 610: The client program 150 communicates with the address book program(s) 170 via address book interface 160. Address book interface 160 supports a wide variety of communication protocols, data formats, etc. such that the client program 150 is capable of communicating with a wide variety of address book applications, cellular and wireless telephones, Persona Digital Assistants, Contact Management Systems, multi-user Customer Relationship Management applications, etc.

Step 615: The generation of Update Requests is typically a periodic activity. When the user desires to generate one or more update requests, the user launches the Update Request Generation process by executing a command. The command which launches the update request generation process can be executed from a menu item 312 (FIG. 3-A) from within the client program 150 or the process can be launched via a command from within the address book application 170.

Upon execution of the appropriate command, the client program 150 accesses Existing Content files 172 within the address book application 170.

Step 620: The client program 150 then displays the Update Request Generation Form (FIG. 3-A) and displays addressee identification information 308 for "eligible" addressees within the Send To list 304. The client program 150 considers an addressee as "eligible" as long as the status tag 160.2 (FIG. 1-F) associated with the addressee's record 171 does not indicate that the addressee is "ineligible". The client program 150 considers an addressee ineligible if the status tag 160.2 indicates an ineligible status such as, for example, a status of "denied", "blocked", "pending", "undeliverable" or other such ineligible status. Status tags 160.2 are stored in the client program 150 or within the user's address book 170 or both depending on the capabilities of the specific address book. Copies of status tags 160.2 are also maintained in the Tags Master file 255 in the server program. Status tags 160.2 indicate the specific eligibility status of a sender's contact(s) (addressees/recipients). A status tag 160.2 of status "denied" indicates that the addressee/recipient has previously received an update request from the user (sender) and has denied the sender's request for updated content 174. A status tag 160.2 of status "blocked" indicates that the addressee has previously received an update request from any user of the system (including, but not necessarily, the sender) and has elected to receive no additional requests from any users of the system. A status tag of status "pending" indicates that the user has previously sent an update request to the addressee and the addressee has not yet responded and the "no-response threshold" (step 745) has not been exceeded. A status tag of status "no response" (set at step 750) indicates that the addressee has not responded to the sender's update request prior to expiration of the response threshold clock 176 (FIG. 2-B) for that request. The no-response threshold (step 745) is determined by the response threshold clock 176. The response threshold clock is a timing function present in the server program 250. The threshold response clock is activated (started) (step 732) for each update request for each addressee each time an update request notification is sent to an addressee. The response threshold clock 176 is infinitely adjustable such that any response threshold time duration can be achieved. The threshold time duration is the time that elapses between the time the response threshold clock 176 is started (step 732) and the time it is reset (step 757 or step 980). A status tag of status "undeliverable" indicates that the email manager 260 (FIG. 2-B) was unable to properly deliver the update request notification (email). Email manager 260 manages the delivery of and responses to update request notifications.

Steps 625 & 630: Addressee records 171 which have a status tag 160.2 of "denied" are displayed (step 630) on the Status screen FIG. 3-B in the denied list 380.

Steps 635 & 640: Addressee records 171 which have a status tag 160.2 of "blocked" are displayed (step 640) on the Status screen FIG. 3-B in the blocked list 382.

Steps 645 & 650: Addressee records 171 which have a status tag 160.2 of "pending" are displayed (step 650) on the Status screen FIG. 3-B in the pending list 384.

Steps 655 & 660: Addressee records 171 which have a status tag 160.2 of "undeliverable" are displayed (step 660) on the Status screen FIG. 3-B in the undeliverable list 386.

Steps 670 & 675: Addressee records 171 which have a status tag 160.2 of "no response" are displayed (steps 675 and 680) on the Update Request Generation form (FIG. 3-A) in the send to list 304.

The Status screen (FIG. 3-B) provides the user with the status of Update Requests and lists of currently ineligible contacts.

Update Request Notifications:

The process of generating update requests involves the user of the client program sending emails to his/her contacts requesting that they update their information in the requestor's address book. The preferred embodiment of the system provides for an automated, batch-oriented (as is well known in the art) process of selecting eligible addressees from a list of eligible addressees and "attaching" email text to the selected eligible addressees. It will be appreciated by one with skill in the art that there are a multiplicity of alternate methods and technologies that could be utilized to facilitate the generation of update requests. The preferred embodiment of the system allows for support of multiple languages such as, for example, Japanese, German, French, Spanish, Arabic, etc. and associated character sets.

Steps 682 through 692: Update Request Generation Form (FIG. 3-A) consists of 4 primary elements: instructions 310, active Update Request email form 314, additional Update Request email form 342 and Send-To list 304. Each primary element of Update Request Generation From (FIG. 3-A) consists of a multiplicity of secondary or sub-elements.

The Update Request Generation form (referred to herein as the "URG" form) contains a text element 310 which displays instructions to the user on how to use the URG form. URG form (FIG. 3-A) contains an Update Request Notification text 344 (often referred to herein as Update Request Notification text or Notification text). The preferred embodiment of the system provides for an email-based Update Request Notification text 344 in which the Update Request Notification is an email which is delivered to the addressee via electronic mail (email) as is well known in the art. Alternatively, Update Request Notification text 344 may be delivered via alternate methods such as voice, instant messaging (as known in the art), postal service, or other such alternate delivery methods. The preferred embodiment of the system provides for alternate delivery methods for Update Request Notifications for addressees with a status tag 160.2 of status "undeliverable". Users activate one Update Request Notification email form 314 (FIG. 3-A) by selecting or "clicking on" (as well known in the art) button element 348/328. Activating button element 348 changes the text displayed on the button, for example, from "Activate this email" to "This is the currently active email". Activating a different email causes that email to become "currently active". Only one email is "active" at a time. Display element 328 is a textual display element used to indicate which Update Request Notification email 314 is currently "active". Display element 317 is a visual display element used to indicate which Update Request Notification email 314 is currently active. Visual display element 317 might be, for example, an additional color element, an additional shading element, or a combination thereof which visually "highlights" the currently active Update Request Notification email form 314.

Update Request Notification email form 314 contains several elements. The currently active URN email form allows the user to select from a multiplicity of pre-configured or "template" email texts by activating menu element 332. The selected template email text is displayed as the Update Request Notification text 344. Users can edit the URN text 344 to suit their specific needs by using text editor 157 or they can proceed with the selected template text as presented. Menu element 320 provides the user with a multiplicity of predefined or template customary (as customary for the user's choice of language) greetings such as, for example, "Hello", "Greetings", "Hi", "Dear", etc. Alternatively the user can create their own custom greeting using text editor 157. Menu element 330 allows the user to select from a multiplicity of salutations for the currently active URN email such as, for example; first name only, first name followed by last name, "Mr."/"Miss."/"Mrs." followed by last name, etc. Alternatively, the system allows the user to create custom salutations using text editor 157. Element 334 can be activated or deactivated by selecting it. Activating element 334 will cause email manager 260 to send to the user's email address, create and store, exact copies of the each URN email sent to each addressee or group of addressees. Users of the system can open (i.e. display within the Update Request Generation screen FIG. 3-A) multiple additional URN email forms 342 by selecting the "open another email" button element 350. Additional URN email forms 342 are displayed on the URG form screen below the previous URN email form and can be positioned on the screen by manipulating slide element 338. As each URN email is activated, it is identified by textual element 316 such as, for example, numbers or letters which increase sequentially as each new URN email form is opened. Additionally each URN email is also, advantageously, color-coded with visual element 340. Visual element 340 assists the user in matching URN emails with appropriate eligible addressees 308.

Users of the system select eligible addressees from a list 304 of eligible addressees by selecting or clicking on the desired addressee's identifying element 308. As each eligible addressee is selected, the identifying element 308 corresponding to the selected addressee is coded to correspond with the URN email 314 active at the time the addressee is selected. The representative embodiment of the system provides for coding of the addressee-identifying element 308 and the URN email by both textual identifiers (element 302) which corresponds to URN email textual identifier element 316, as well as color-coding via visual identifier elements 340. Thus, for example, all addressees selected from list 304 while URN email "1" (as identified by textual element 316) is active will be coded with a "1" in element 302. Additionally, as addressees are selected from send-to list 304, identifying element 308 for the selected addressee is color-coded to correspond to the visual identifying element 340 (color element) of the then currently active URN email. Thus, for example, a user may open 3 URN email forms. URN email "1" text may be worded appropriately to send to "personal" acquaintances and is color code green, email "2" may be worded for "customers" and is color coded yellow, and email "3" may be worded appropriately for "vendors" and is color coded blue, and so on. Users can view additional addressees by activating slide element 336. The user can select all addressees by activating button element 306. As each addressee is selected, the corresponding identifying information such as, for example, first and last name and email address, is displayed additionally in display element 324. Display element 324 expands to display a multiplicity of addressees simultaneously. Users can reassign addressees to different URN emails by activating a URN email 314 or additional URN email 342 and selecting addressees which they desire to reassign to the currently active email. Display element 326, displays identifying information of the sender (user of the system) such as, for example, first name and last name and email address. Display element 322 displays the subject of the URN email which the user can edit using editor 157. Element 346 is a text element which the client program 150 adds to each and every outbound URN email prior to sending the URN emails 314 to the server program. Text element 346 contains a URL (i.e. world wide web address) which recipients of the URN email will utilize to view the update form (FIG. 3-D). Text element 346 is not editable by the user.

Steps 690 & 692: Once the user has completed the process of selecting and editing URN email forms and attaching addressees, etc. (steps 682-688) to their satisfaction, the user causes the client program 150 to send (step 692) the update requests to the server program 250 by activating button element 352. Upon receipt by the server program 250, the client program 150 causes the appropriate addressee records to be tagged as "requested" (step 690).

Figure 7:
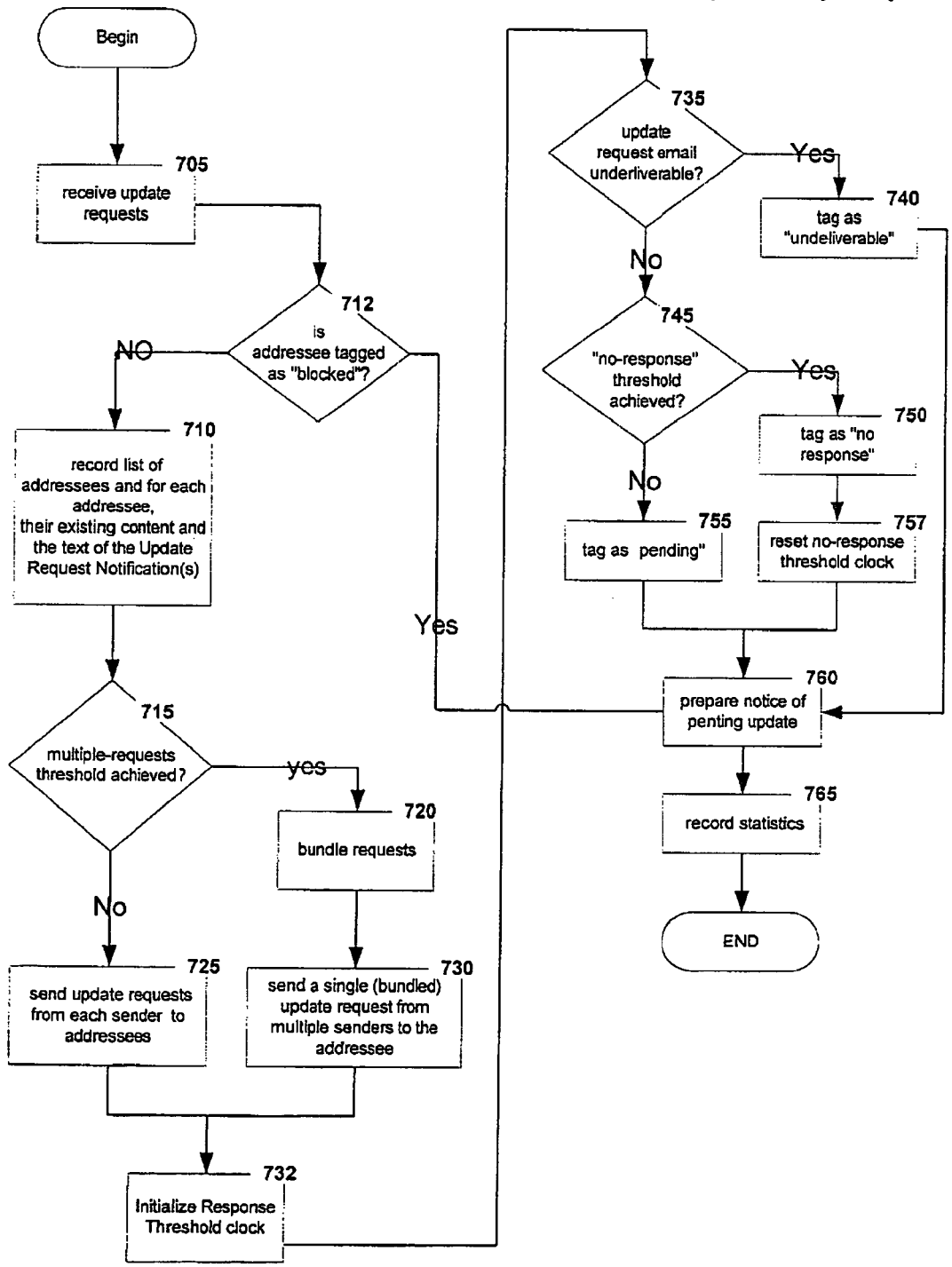
FIG. 7 is a block diagram illustrating representative server program functions for processing and sending Update Requests.

Processing Update Requests. FIG. 7:

Steps 705 & 710: Server program 250 receives current update requests from the client program 150 and records (step 710) the addressee identifiers 308 (i.e. first and last name and email address) and the corresponding URN email text 344 for each addressee.

Steps 712-732: Server program 250 compares current addressee identifiers 308 with information contained in the Tags master file 255. Current addressees with a status tag of status "blocked" are tagged as "blocked" in the status tag file 160.2 on the client computer 100 and a notice of pending update 177 is prepared (step 760) for later delivery to the sender (step 1010). The server program compares current addressee identifiers 308 with information in the Update Request master file 261. If the "multiple-requests" threshold (step 715) has been exceeded, then the server program stores the update request from the sender and "bundles" the sender's URN email together with other senders' URN emails for delivery as one email at a later time. The multiple-requests threshold is a counting function of the server program 250 which increments by one each time a URN email 314 is received by the server program 250 addressed to a single addressee within a certain time window. For example, if the multi-request threshold is set to three and the time window is set to 24 hours then the server program will begin to save up (bundle) URN emails for that particular addressee upon receipt of the 4$^{th}$ URN email and any subsequent URN emails received by the server program within 24 hours of the previous delivery of URN emails to the addressee. When the time window expires, the server program's email manager 260 forwards (step 730) to the addressee one single URN email containing a listing of all the individual URN emails and their respective senders and initializes the Response Threshold clock 176 (step 732) and sets a "pending" tag (step 755) for the addressee and each sender. If the multi-request threshold (step 715) has not been exceeded, then the email manager 260 forwards (step 725) the URN email(s) 314 from each sender to the appropriate addressees and starts (i.e. initializes) the Response Threshold clock 176 (step 732) and sets the status tag in the tags master file 255 to a status of "pending" for each addressee and sender combination.

Steps 735-765: All sent URN emails are tagged as "pending" (step 755) until such time as they are tagged with a different status tag. Email manager 260 records statistics in the statistics file 264.10 such as the date, time and email address of every URN email sent.

Email manager 260 "listens" for responses to sent URN emails. Responses that indicate that an email is "undeliverable" (step 735) are tagged as "undeliverable" (step 740) and a notice of pending update 177 (FIG. 2-B) (step 760) is prepared for later delivery (step 1010). The server program communicates pending updates and status updates (step 960) to the client program on a periodic basis (typically daily). If a response from the addressee is not received by the email manager 260 by the time the Response Threshold (determined by Response Threshold clock 176) has been reached, then the addressee is considered non-responsive and a "no response" tag is activated (step 750) for that addressee and the corresponding sender (user) and the Response Threshold clock for the addressee is reset to zero.

Figure 8:
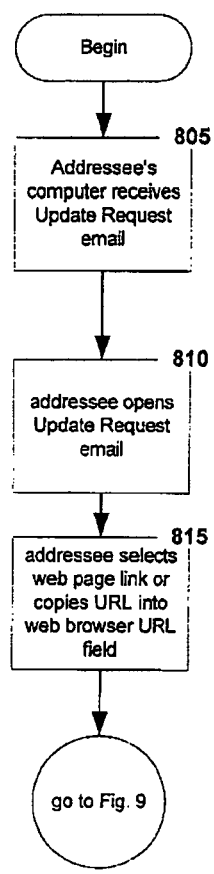
FIG. 8 is a block diagram illustrating representative steps which a receiver/addressee might follow to process a received Update Request.
Figure 9:
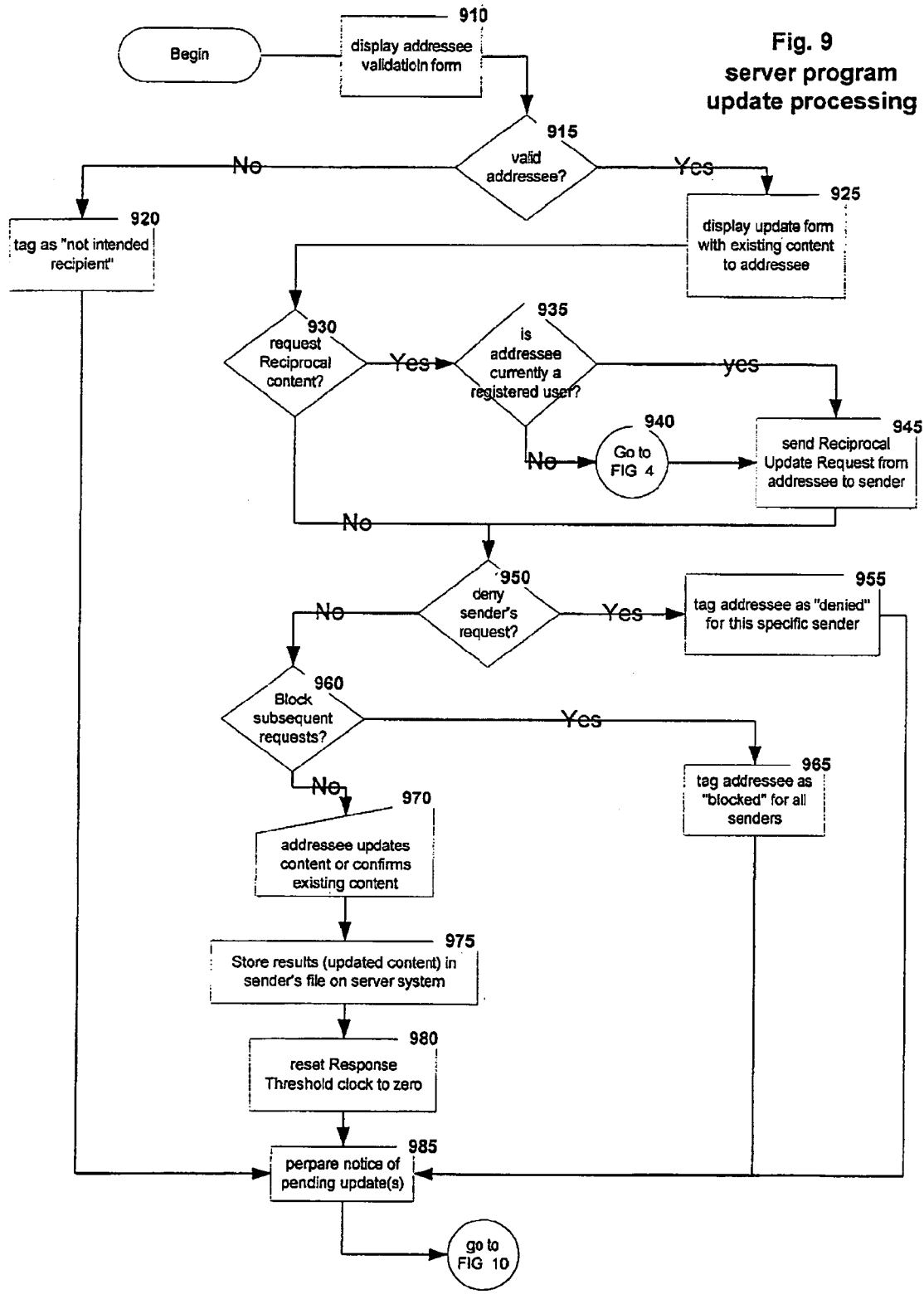
FIG. 9 is a block diagram which illustrates representative functions of the server system for processing Update Requests.
Figure 10:
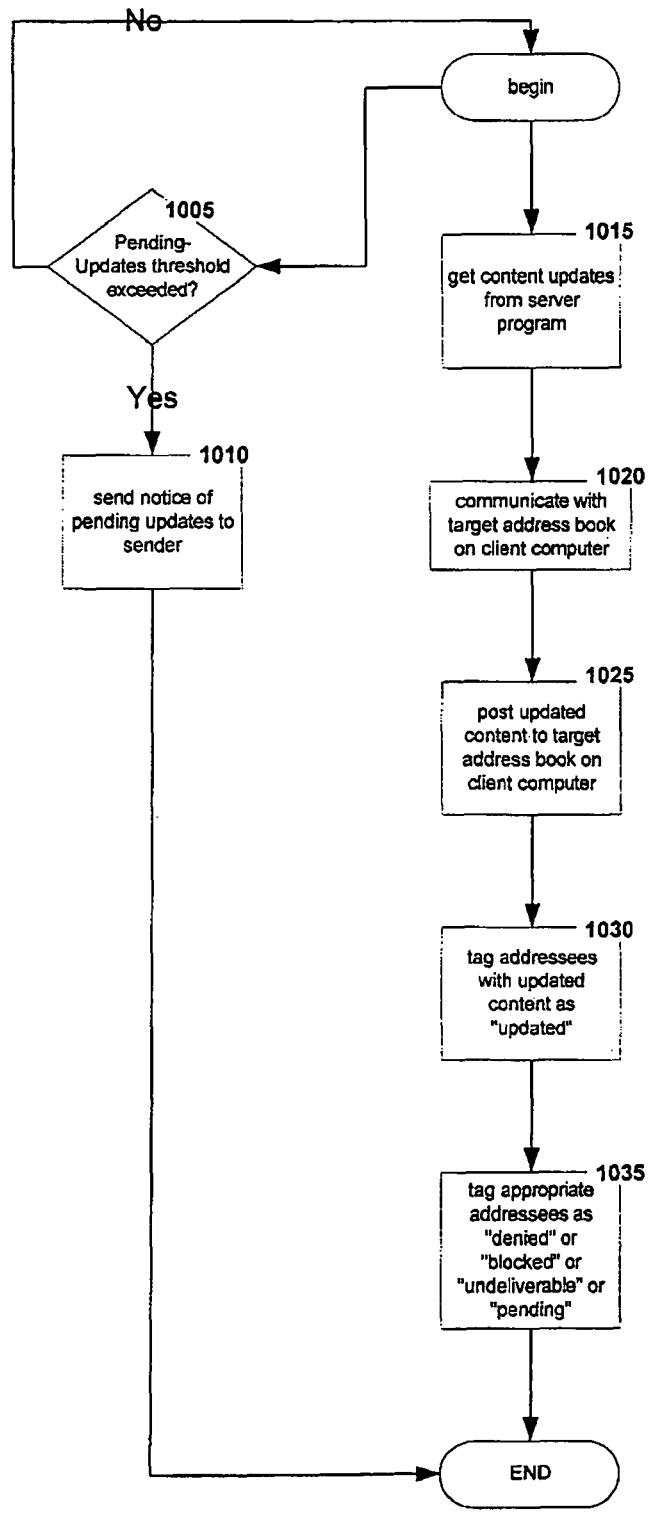
FIG. 10 is a block diagram which illustrates representative functions of the client program for processing Updated content.

Steps 805-820 (FIG. 8): Addressee processes: Addressee receives and opens the URN email and clicks on text element 346 contained in the URN email 314. The URL contained in the text element 346 when entered into a web browser will cause the web browser to display to the recipient the Addressee Validation form (FIG. 3-C).

Update Processing:

Steps 910-925: In the representative embodiment of the system, the Addressee Validation form (FIG. 3-C) is a web page and is "served" (as is well known in the art) by the server program 250. Addressee Validation form FIG. 3-C contains a text element 395 which displays the identification information 308 of the intended recipient (addressee). If the recipient is not the intended recipient they will select "NO" button element 397. Activating "NO" button element 397 will cause the server program to tag the recipient (step 920) as "not intended recipient" and prepare a "notice of pending update" (step 985) for later delivery to the sender (step 1010). If recipient activates "YES" button element 396, then the server program 250 will display (step 925) update screen FIG. 3-D.

FIG. 3-D: In the representative embodiment of the system, the Update Form 360 (FIG. 3-D) is a web page and is "served" (as is well known in the art) by the server program 250. Update form 360 contains a text element 363. The text element 363 typically displays a greeting message, but can display any type of information such as, for example, instructions. When activated, help button element 362 displays additional instructions. Sender identification element 364 displays identification information about the sender, thus allowing the recipient to confirm the identity of the sender of the URN email. A currently active visual element 365 is a visual element such as, for example, color, shading, or pattern which identifies the "currently active" sender 370. Sender information element 370 displays identification information such as, for example, first and last names, email address, company name, etc. about the currently active sender. Additional sender information elements 376 display identification information about additional senders (step 330). The additional sender information elements 376 can display identification information for a multiplicity of additional senders. Additional sender information elements 376 can be viewed by the addressee by manipulating slide element 378. A different currently active sender is activated by the user by, for example, clicking on one of the multiplicity of elements 376. Content display elements 366, 367, 368 and 369 display existing content 172. Existing content 172 is the content related to the addressee which is currently stored in the user's (sender's) address book 170. Display element 366 displays addressee identification information 308 and is editable by the recipient. Element 367 displays a listing of one or more "senders" (i.e. users sending Update Request Notifications to the addressee) (steps 325 or 330). A response matrix element 371 allows the addressee to select among multiple response elements 372, 373, 374 and 375. The addressee activates and deactivates response elements 372, 373, 374 and 375 by, for example, clicking on them (as is well known in the art). Activating an occurrence of response element 372, 373, 374 or 375 produces a visual confirmation such as, for example, a "check mark" for that occurrence of that element. The addressee can deactivate an occurrence of a response element by clicking on it again which removes the visual confirming check mark. Activation of an occurrence of a response element 372 adjacent to a sender identifier 370 or additional sender 376 will result in an approved Update Request (step 950) for the associated sender 370 or additional sender 376. Activation of an occurrence of a response element 373 adjacent to a sender identifier 370 or additional sender 376 will result in a reciprocal Update Request (step 930) from the addressee to the associated sender 370 or additional sender 376 (i.e. the addressee is requesting that the sender provide the addressee with updated content). Activation of an occurrence of a response element 374 adjacent to a sender identifier 370 or an additional sender 376 will result in a denied Update Request (step 930) for the associated sender 370 or additional sender 376. Activation of an occurrence of a response element 375 adjacent to a sender identifier 370 or an additional sender 376 will result in blocked Update Requests (step 940) for all future senders.

Element 368 displays a first grouping of existing content 172 from the address book 170 of the currently active (as identified by element 365) sender 364. Element 369 displays an additional grouping of existing content 172 from the currently active sender. Update form 360 is capable of displaying a multiplicity of existing-content groupings. Additional content groupings can be viewed by manipulating slide element 377. Existing-content groupings typically group related elements of existing content such as, for example, "business" related contact information or "personal" contact information as depicted in the sample Update form (FIG. 3-D). Elements 366, 368 and 369 are editable by the user.

Steps 930-960 Update Processing:

If the user activates an occurrence of a response element 373 adjacent to a sender identifier 370 or additional sender 376, a reciprocal Update Request (step 930) will be generated from the addressee to the associated sender 370 or additional sender 376 if the addressee is currently a registered user of the client program 150. If the addressee is not currently a registered user then the addressee will be directed through the registration process (FIG. 4) prior to a Reciprocal Update Request (step 945) being generated. Addressees can deny a sender's update request (step 950) by activating an occurrence of a response element 374 adjacent to a sender identifier 370 or additional sender 376. Addressees can block all further update requests from all future senders by activating an occurrence of a response element 375 adjacent to a sender identifier 370 or additional sender 376. Addressees can update existing content (step 970) by editing fields present within existing-content elements 366, 368 and 369 by selecting the desired field and entering changed content. Addressees approve delivery of updated content 174 to senders by activating an occurrence of a response element 372 adjacent to a sender identifier 370 or additional sender 376. Addressees cause updated content 174 and current update request responses to be stored (step 975) on server system 130, Response threshold to be reset to zero (step 980) and notices of pending updates 177 to be prepared (step 985) by activating button element 379.

Steps 1005-1035, Client Program Update Processing:

Server program 250 sends notifications of "pending updates" to senders on a periodic basis. The frequency of such periodic notifications is determined by a timing function such as, for example, Pending-Updates threshold clock 178. The frequency of update notifications is infinitely variable. Pending updates notification is not required for proper functioning of the system as the representative embodiment of the system provides for automatic execution of frequent communications between client program 150 and server program 250 during which updates are transacted. Client program 150 establishes a communication session with the server program 250 and requests updated content 174 (step 1015). Server program 250 passes to the client program updated content 174 as well as status tags 255 and, when applicable, statistics 264.10, event information 264.8, log information and client program updates 256.2.2 as well as other appropriate information necessary for the proper operation of the system. Client program 150 communicates with address book 170 (step 1020) via address book interface 160 and updates addressee records 171 in address book 170 (step 1025) with updated content 174. To provide for maximum flexibility, it is advantageous that the re-system provide for storage and retrieval of updated content and existing content on both the client computer as well as on the server system. As such, the representative embodiment of the system provides for storage and retrieval of updated content and existing content on both the client computer 100 and the server system 130. The system allows that addressee records may have portions of updated and/or existing content stored on both the client computer 100 and the server system 130, even if the content makes up just one addressee record. For example, the user may elect to store first name, last name and phone number information on a wireless telephone embodiment of the client computer 100 and associated additional content such as, for example, address, company, etc. on the server system 130. Client program 150 updates status tags 160.2 for addressee records 171 containing updated content with a status tag of "updated". Client program 150 also updates or applies (step 1035) other status tags to addressee records as appropriate such as, for example, "denied", "blocked", "undeliverable", "pending", etc. Status tags 160.2 and 255 each include a date and time stamp indicating when the status tag was updated.

What is claimed is:

1. A computer-implemented method for updating contact information in a network with client and server computers, comprising:
   a. using a computer processor of a client computer, extracting contact information from a memory of the client computer, wherein the contact information is for an addressee from an address book data structure for an address book;
   b. presenting on a display of the client computer at least one item of extracted contact information for the addressee;
   c. sending the extracted contact information to a server only if affirmative user input is received in response to the displayed contact information, which extracted contact information causes a computer processor of the server to generate and send over a network to an addressee computer of the addressee a contact information update request;
   d. receiving, from the addressee computer via the server, updated contact information for the addressee that is generated on the addressee computer; and
   e. using the updated contact information to update the contact information of the addressee in the memory of the client computer.

2. The method of claim 1, wherein the contact information update request is sent via an electronic communication.

3. The method of claim 2, wherein the electronic communication is an e-mail or text message.

4. The method of claim 1, wherein the contact information update request includes existing contact information associated with the addressee.

5. The method of claim 4, wherein the existing contact information is extracted from the address book data structure.

6. The method of claim 1, wherein the update request includes an identifier of a user of the client computer.

7. The method of claim 1, wherein updated contact information is received on the client computer if the addressee has i) provided an update to the contact information or ii) a confirmation of the contact information.

8. A non-volatile computer-readable hardware storage medium comprising instructions that, upon execution by a computer processor, implement a method for updating contact information on a client computer, the method:

a. using a computer processor of a client computer, extracting contact information from a memory of the client computer, wherein the contact information is for an addressee from an address book data structure for an address book;

b. presenting on a display of the client computer at least one item of extracted contact information for the addressee;

c. sending the extracted contact information to a server only if affirmative user input is received in response to the displayed contact information, which extracted contact information causes a computer processor of the server to generate and send over a network to an addressee computer of the addressee a contact information update request;

d. receiving, from the addressee computer via the server, updated contact information for the addressee that is generated on the addressee computer; and e. using the updated contact information to update the contact information of the addressee in the memory of the client computer.

9. The non-volatile computer-readable hardware storage medium of claim 8, wherein the contact information update request is sent via an electronic communication.

10. The non-volatile computer-readable hardware storage medium of claim 9, wherein the electronic communication is an e-mail or text message.

11. The non-volatile computer-readable hardware storage medium of claim 8, wherein the contact information update request includes existing contact information associated with the addressee.

12. The non-volatile computer-readable hardware storage medium of claim 11, wherein the existing contact information is extracted from the address book data structure.

13. The non-volatile computer-readable hardware storage medium of claim 8, wherein the update request includes an identifier of a user of the client computer.

14. The non-volatile computer-readable hardware storage medium of claim 8, wherein updated contact information is received on the client computer if the addressee has i) provided an update to the contact information or ii) a confirmation of the contact information.

* * * * *